(12) United States Patent
Chun

(10) Patent No.: US 10,585,649 B2
(45) Date of Patent: Mar. 10, 2020

(54) ELECTRONIC BLOCK KIT SYSTEM FOR SCRATCH PROGRAMMING

(71) Applicant: Seok Ju Chun, Seoul (KR)

(72) Inventor: Seok Ju Chun, Seoul (KR)

( * ) Notice: Subject to any disclaimer, the term of this patent is extended or adjusted under 35 U.S.C. 154(b) by 0 days.

(21) Appl. No.: 16/081,615

(22) PCT Filed: Dec. 6, 2016

(86) PCT No.: PCT/KR2016/014207
§ 371 (c)(1),
(2) Date: Nov. 30, 2018

(87) PCT Pub. No.: WO2017/150788
PCT Pub. Date: Sep. 8, 2017

(65) Prior Publication Data
US 2019/0095178 A1    Mar. 28, 2019

(30) Foreign Application Priority Data

Mar. 3, 2016 (KR) .......................... 10-2016-0025719
Nov. 16, 2016 (KR) .......................... 10-2016-0152771

(51) Int. Cl.
*G06F 9/44* (2018.01)
*G06F 8/34* (2018.01)
(Continued)

(52) U.S. Cl.
CPC ............... *G06F 8/34* (2013.01); *G06F 13/38* (2013.01); *G09B 19/00* (2013.01);
(Continued)

(58) Field of Classification Search
CPC ....................................................... G06F 9/44
See application file for complete search history.

(56) References Cited

U.S. PATENT DOCUMENTS 4,082,922 A * 4/1978 Chu .......................... H04J 3/24
370/230
4,236,207 A * 11/1980 Rado ................... G06F 11/1008
711/106
(Continued)

FOREIGN PATENT DOCUMENTS

KR    1020120130420 A    12/2012
KR    1020130068940 A     6/2013
(Continued)

OTHER PUBLICATIONS

McNerney ("Tangible Programming Bricks: An approach to making programming accessible to everyone"), Feb. 2000.*
(Continued)

*Primary Examiner* — Jae U Jeon
(74) *Attorney, Agent, or Firm* — STIP Law Group, LLC

(57) ABSTRACT

The present disclosure relates to an electronic block kit system for scratch programming. And more particularly, the present disclosure relates to an electronic block kit system which includes electronic blocks of hardware shapes each corresponding to instruction blocks of the scratch programming, which are used in the program coding education, and executes a program controlling a sprite in accordance with a program flow chart when the electronic blocks are connected along the program flowchart. The electronic block kit system includes: a master electronic block connected to the smart terminal and configured to form a data communication path with the smart terminal and receive a supply voltage; and a plurality of slave electronic blocks. The slave electronic block can be combined with one of the master electronic block and a different slave electronic block. The master electronic block is disposed and the plurality of slave electronic blocks are cascade-combined to a lower portion of the master electronic block. The slave electronic block forms the data communication path with one of the master elec- (Continued)

tronic block and the different slave electronic block, which is combined with an upper portion of the slave electronic block, and receives the supply voltage from the combined upper electronic block.

The above-mentioned electronic block kit system can connect the electronic blocks, which are touched with a human's hand, with one another and allow the scratch programming to be easily performed. Therefore, electronic block kit system can enable a program controlling a sprite to be easily programmed without any computer.

5 Claims, 29 Drawing Sheets

(51) Int. Cl.
    *G09B 23/18*     (2006.01)
    *G09B 19/00*     (2006.01)
    *G06F 13/38*     (2006.01)
    *G06F 13/42*     (2006.01)

(52) U.S. Cl.
    CPC ......... *G09B 19/0053* (2013.01); *G09B 23/18* (2013.01); *G06F 13/4282* (2013.01); *G06F 2213/0042* (2013.01)

(56) References Cited

U.S. PATENT DOCUMENTS

| | | | |
|---|---|---|---|
| 6,441,653 B1* | 8/2002 | Spurlin | H03K 17/166 326/87 |
| 2005/0026537 A1 | 2/2005 | Hsieh | |
| 2010/0086119 A1* | 4/2010 | De Luca | H04M 3/2281 379/213.01 |
| 2012/0122059 A1* | 5/2012 | Schweikardt | A63H 33/04 434/118 |
| 2014/0170633 A1 | 6/2014 | Chong | |

FOREIGN PATENT DOCUMENTS

| | | |
|---|---|---|
| KR | 101368749 B1 | 2/2014 |
| KR | 1020140127492 A | 11/2014 |

OTHER PUBLICATIONS

McNerney ("Tangible Programming Bricks: An approach to making programming accessible to everyone"), Feb. 2000 (Year: 2000).*
International Search Report of PCT/KR2016/014207, dated Mar. 14, 2017, English Translation.

* cited by examiner

[Figure 1]
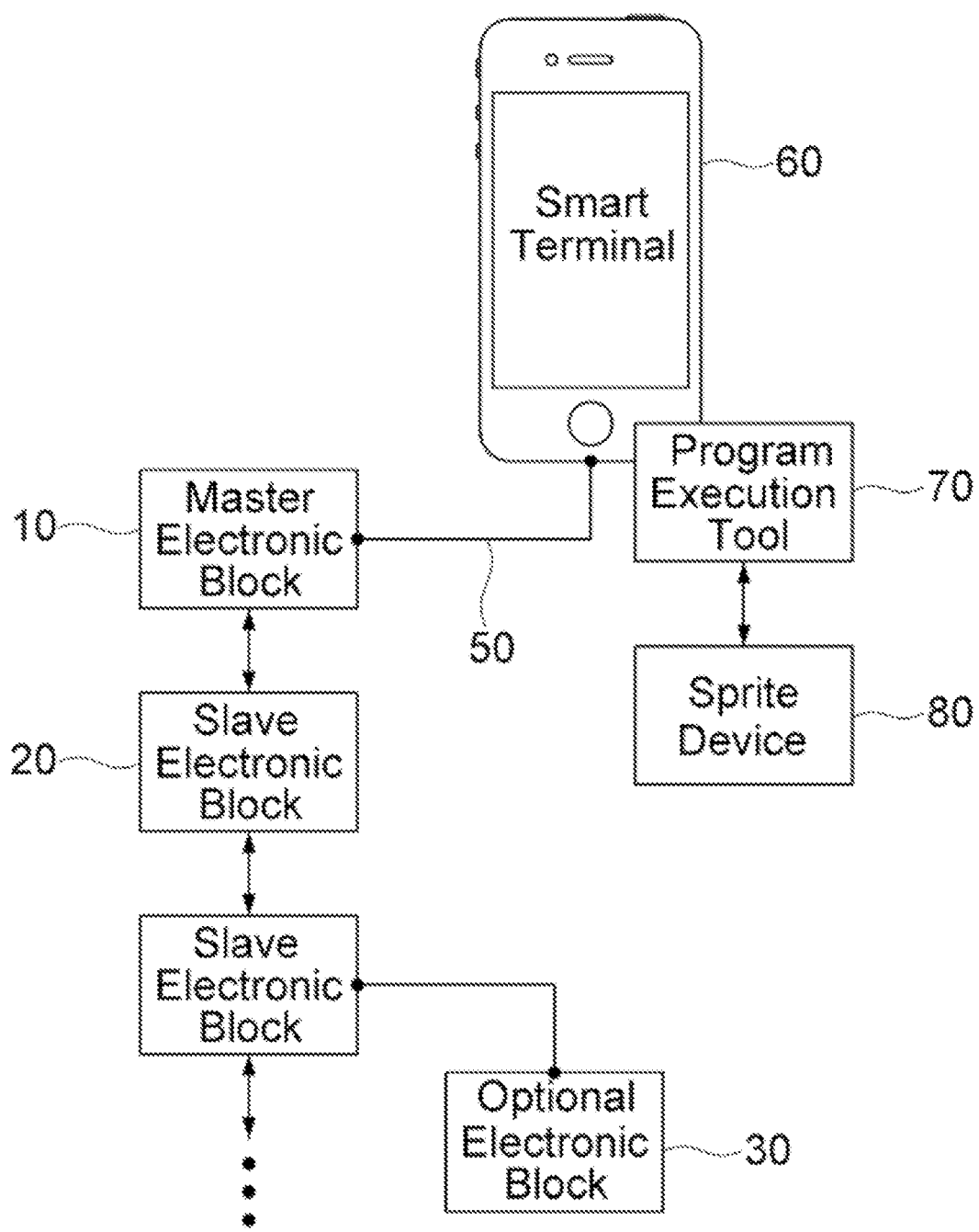

[Figure 2]
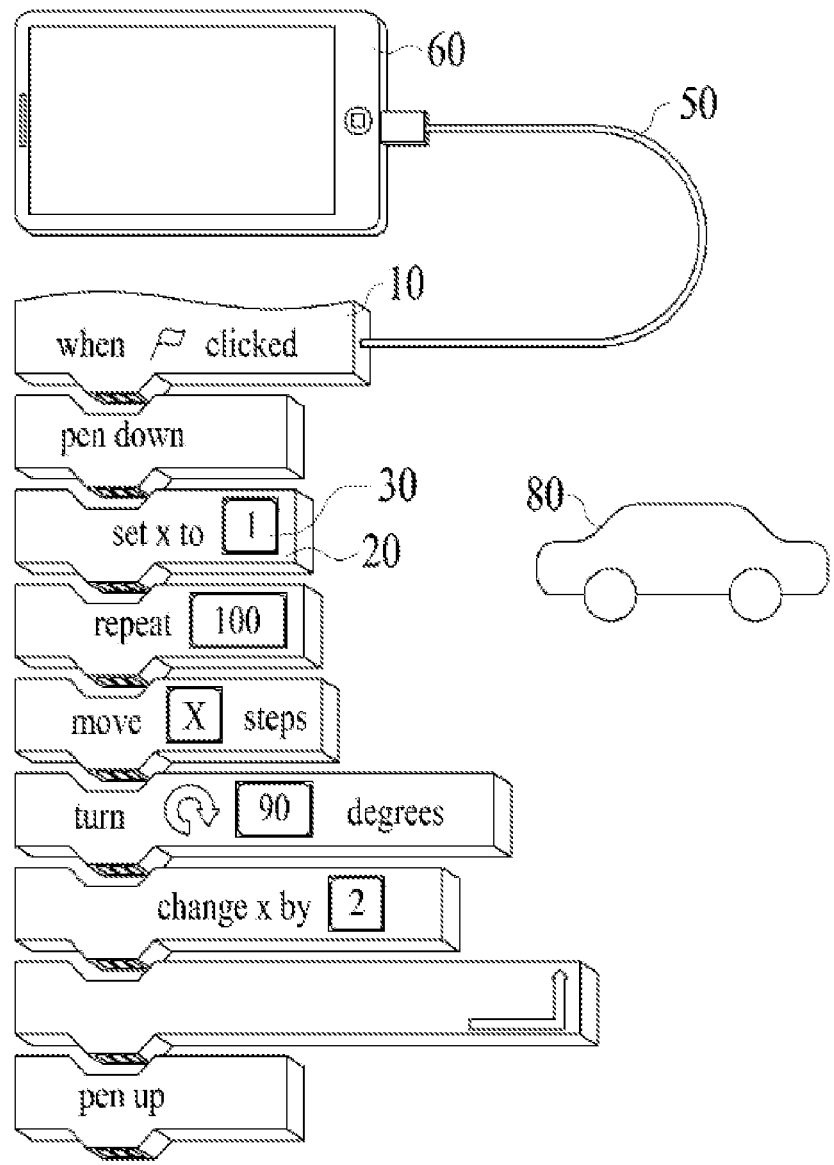
[Figure 3]
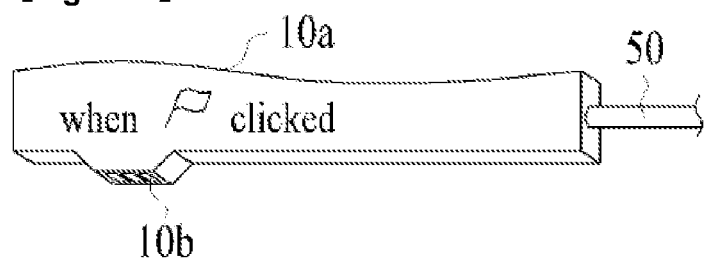

【Figure 4】
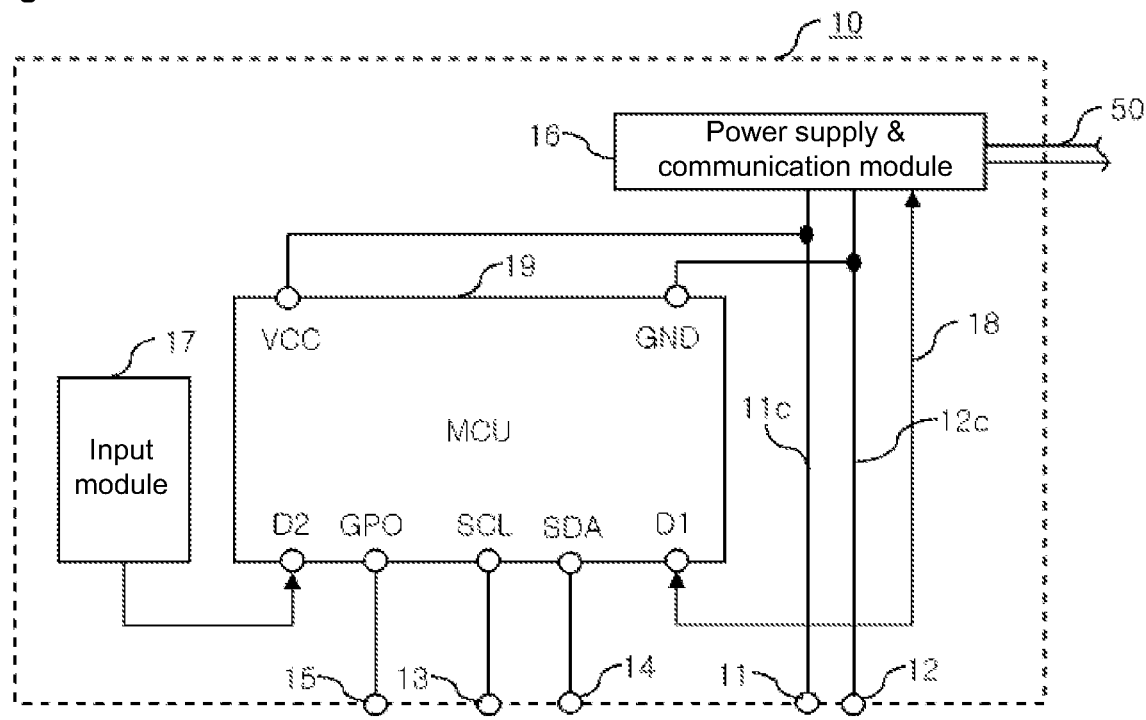
【Figure 5】
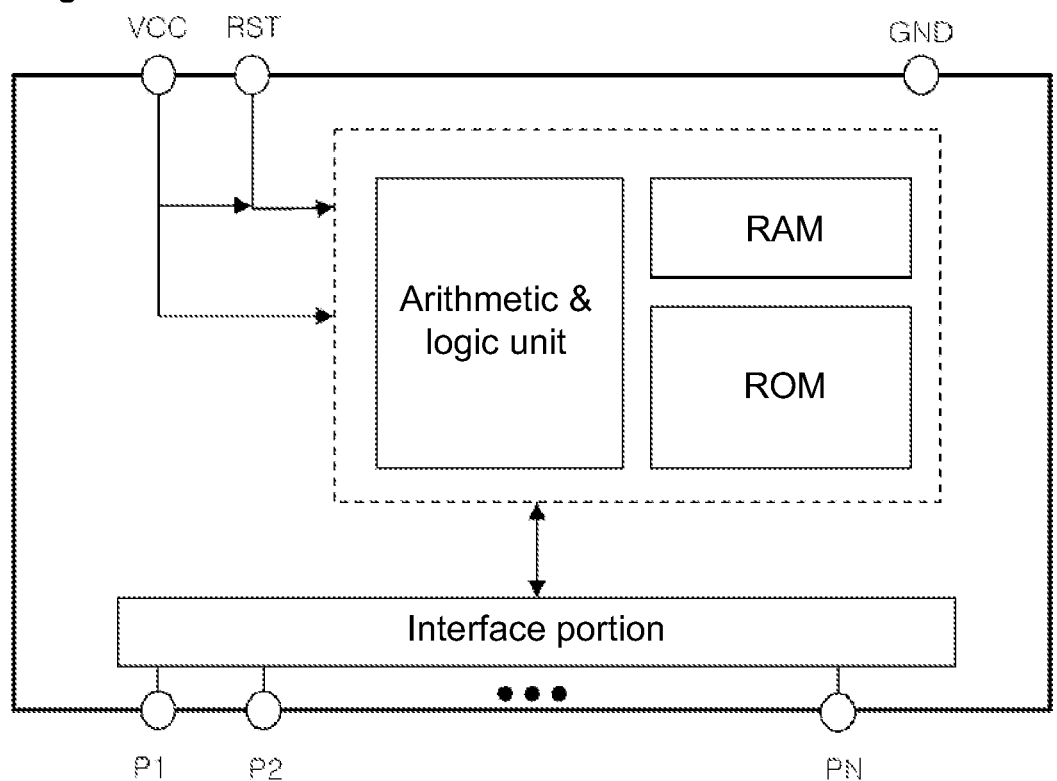

【Figure 6】
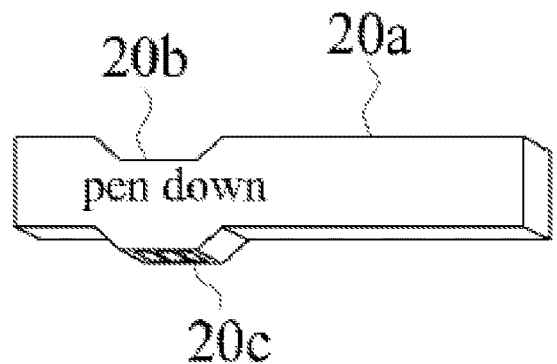
【Figure 7】
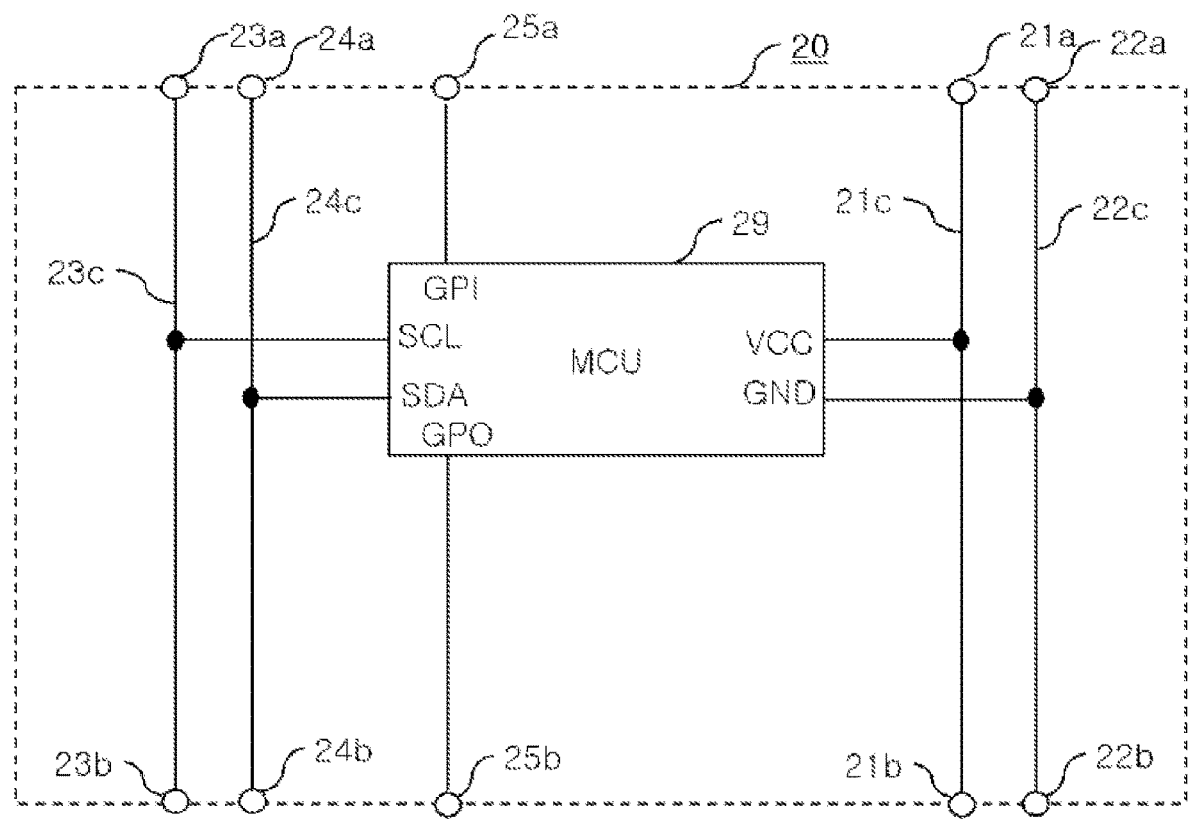

【Figure 8】
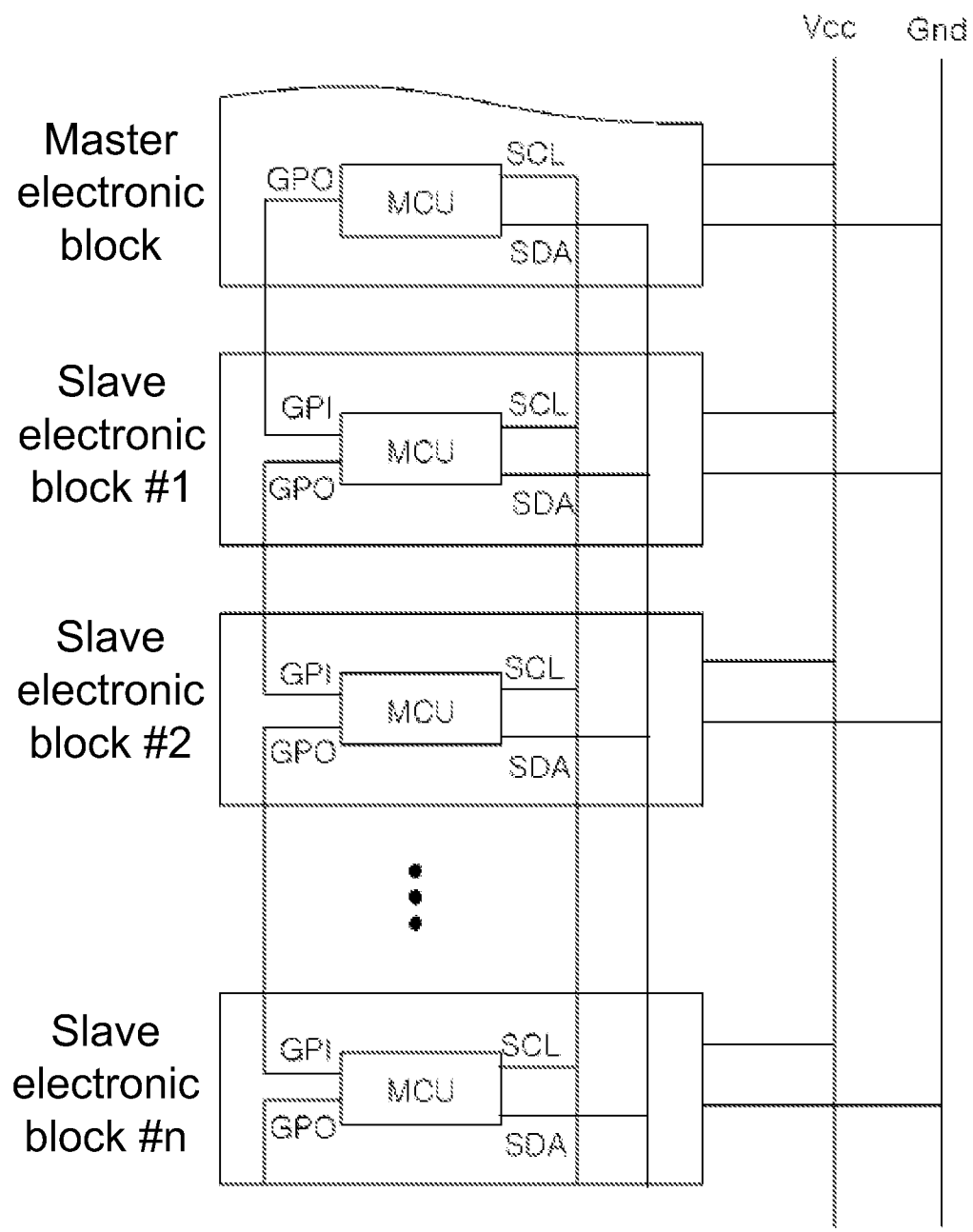

[Figure 9]
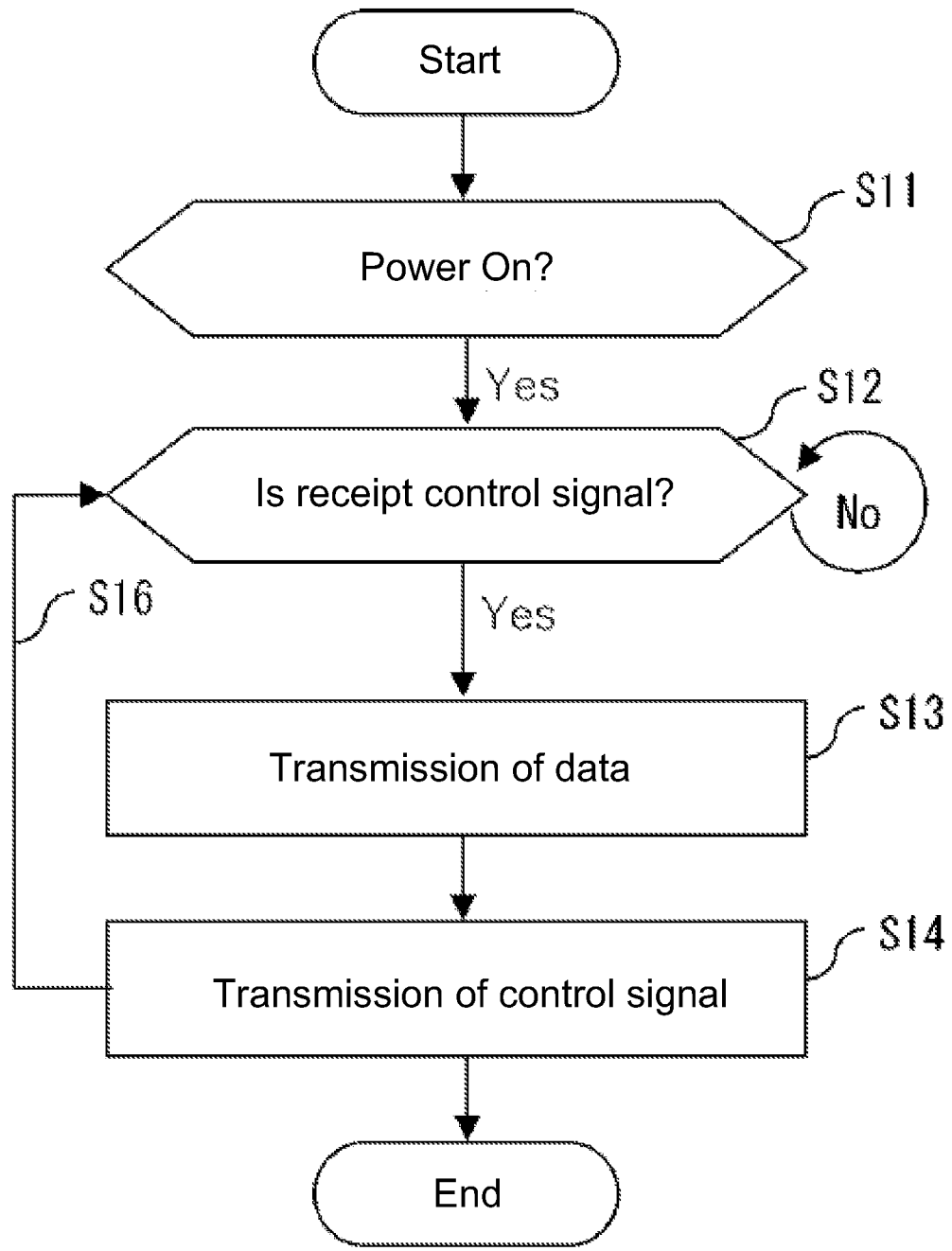

[Figure 10]
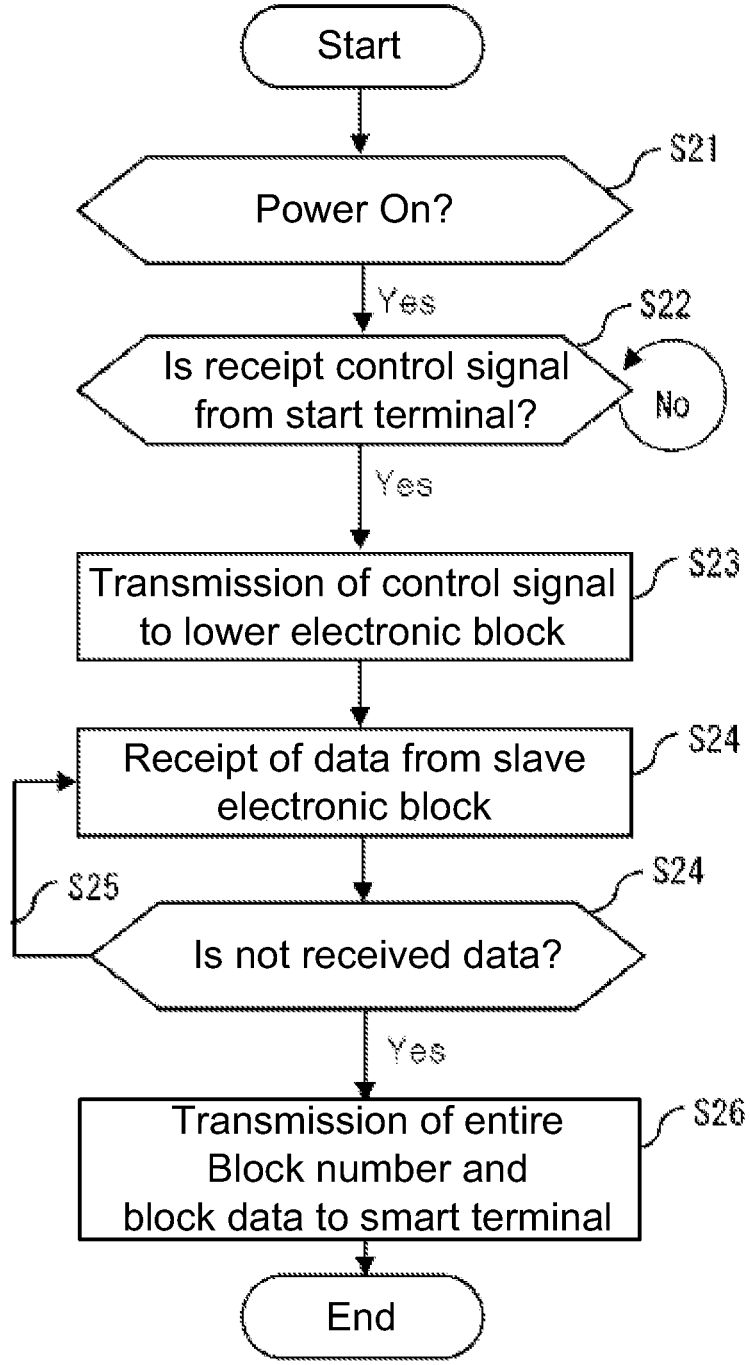

[Figure 11]
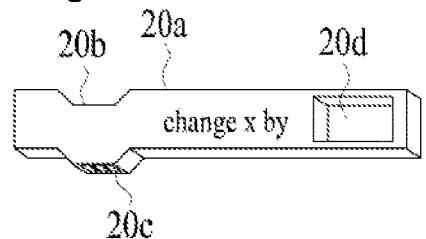
[Figure 12]
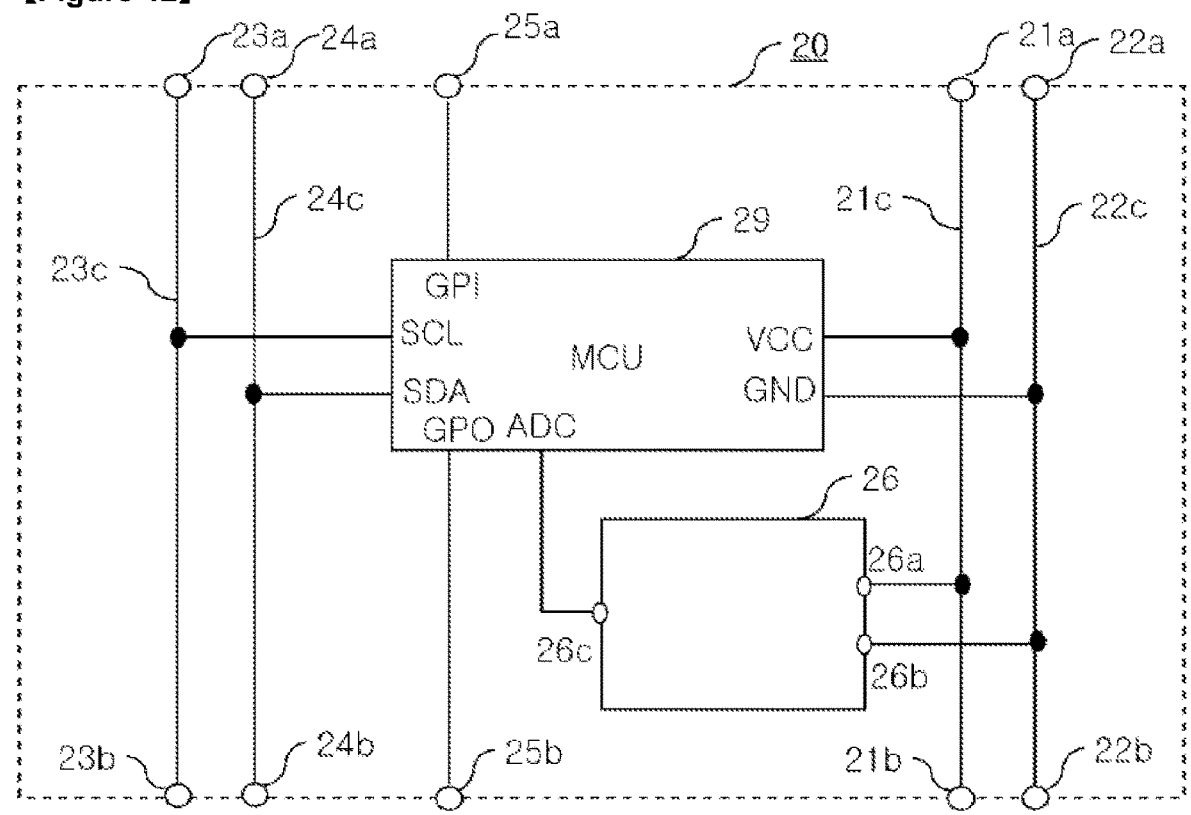
[Figure 13]
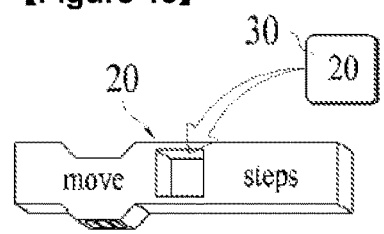

【Figure 14】
| x | y |
| 1 | 2 | 3 | 4 | 5 | 6 | 7 | 8 | 9 |
| -1 | -2 | -3 | -4 | -5 | -6 | -7 | -8 | -9 | -10 |
| 10 | 20 | 30 | 40 | 50 | 60 | 70 | 80 | 90 | 100 |
| 45 | 90 | 180 | 270 | 360 |
【Figure 15】
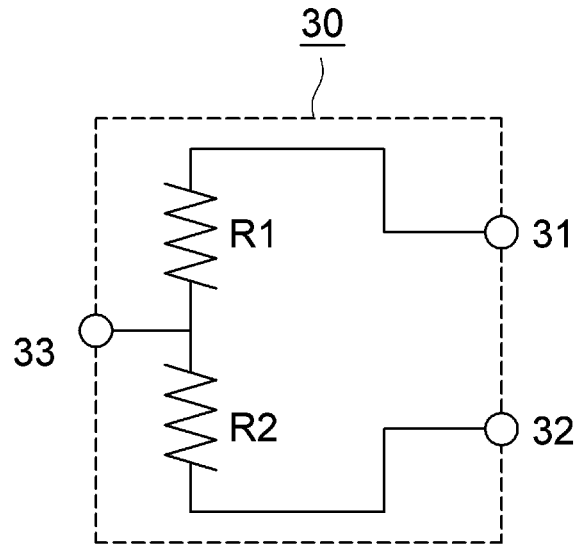

【Figure 16】
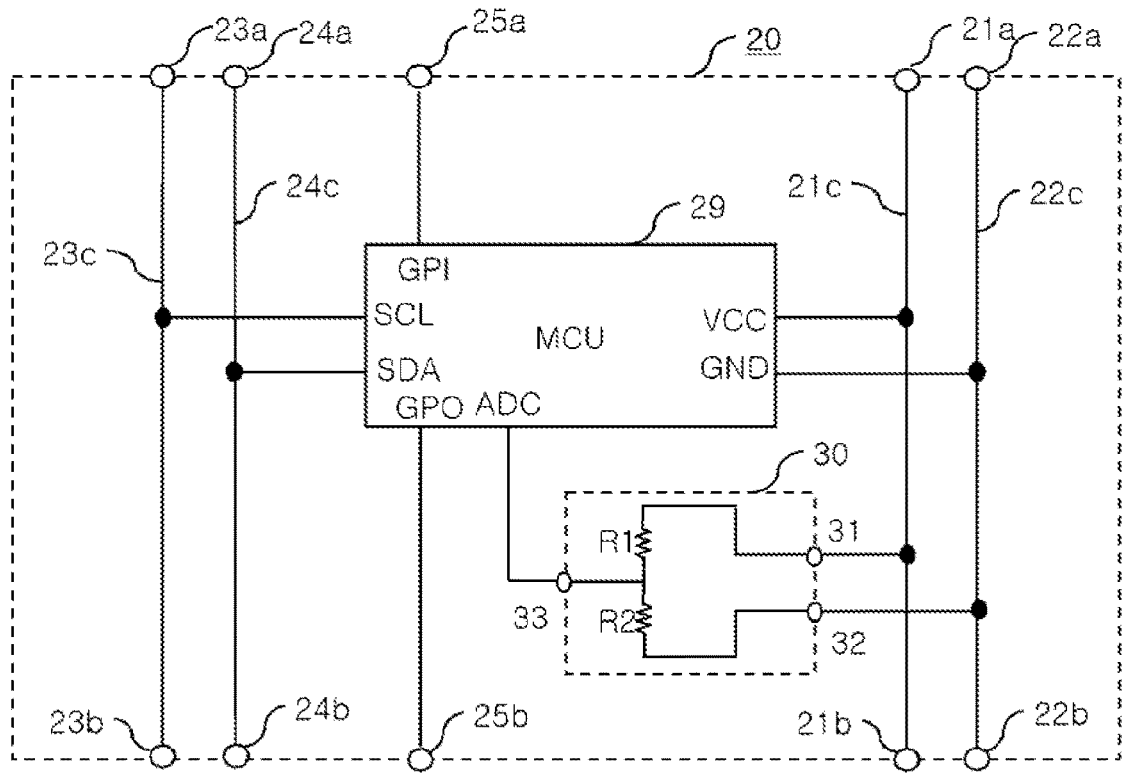
【Figure 17】
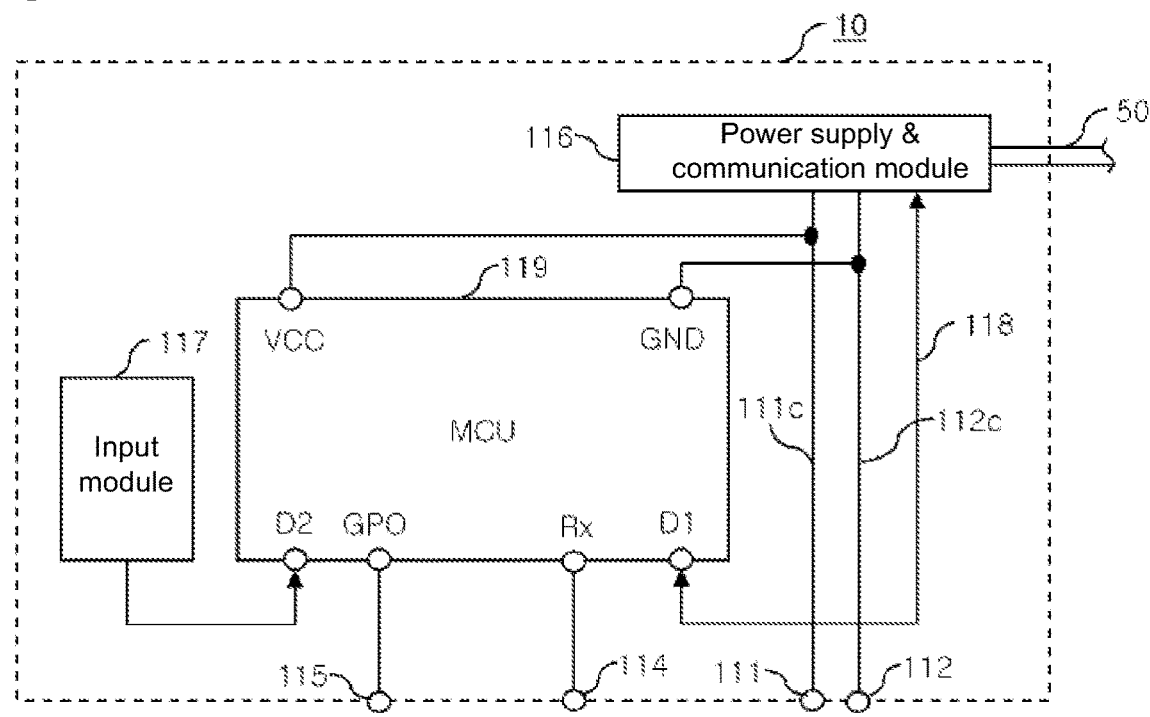

[Figure 18]
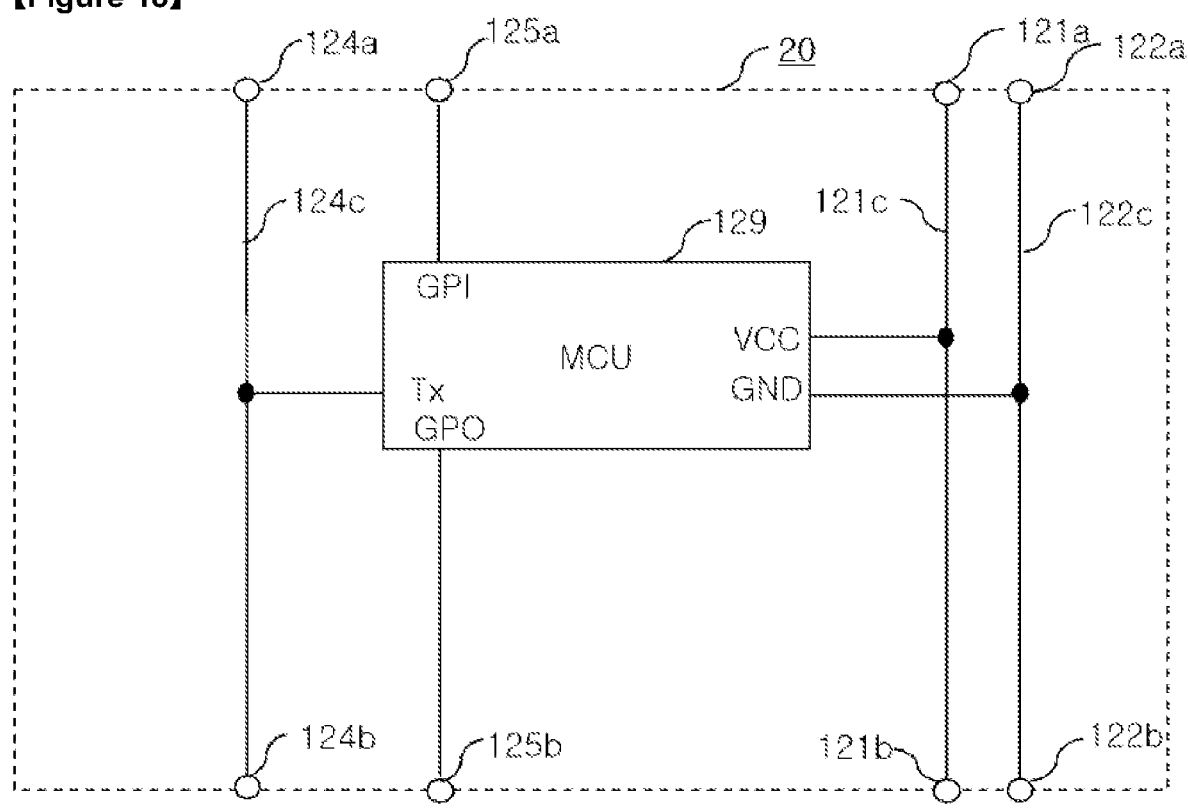

【Figure 19】
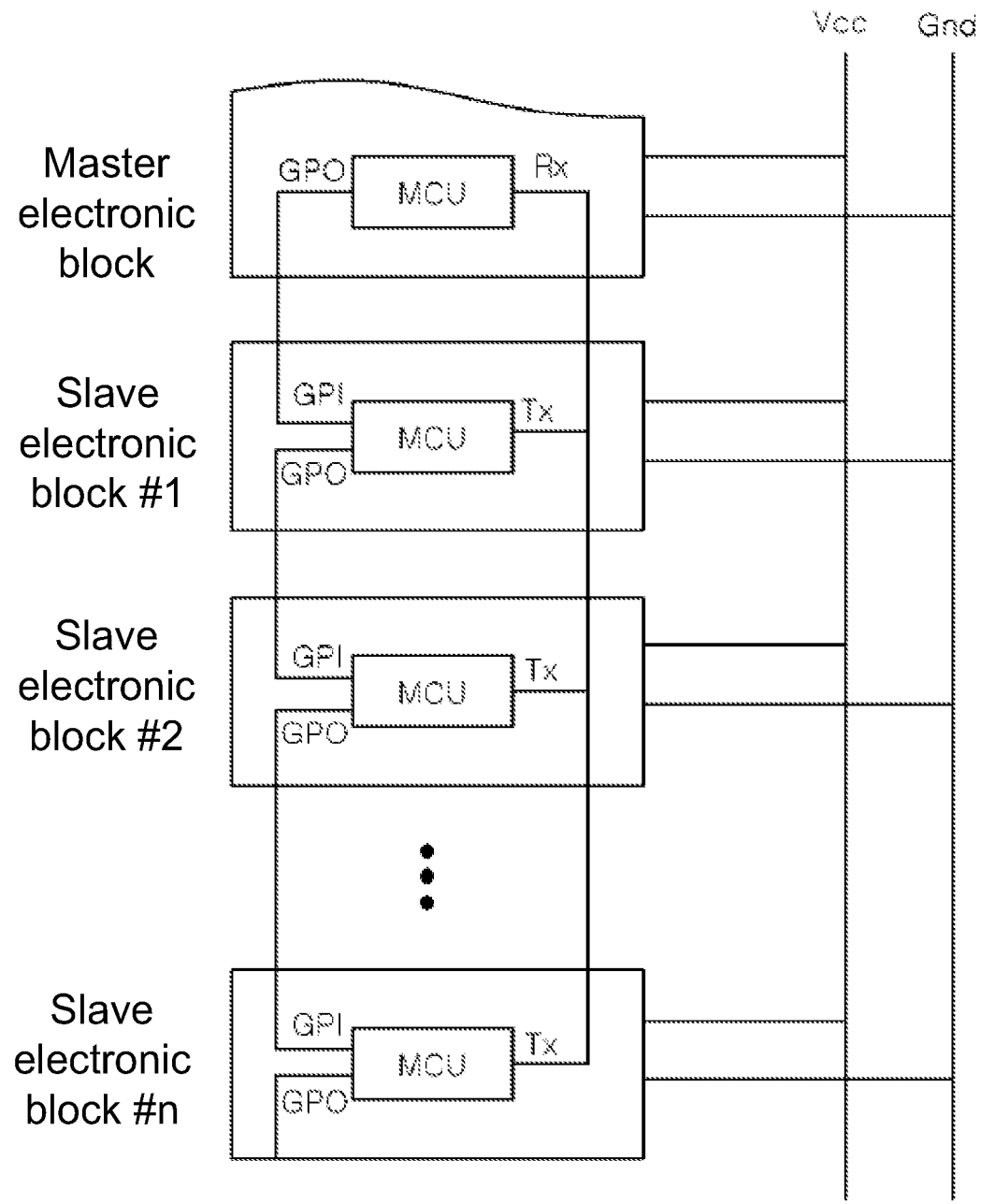

【Figure 20】
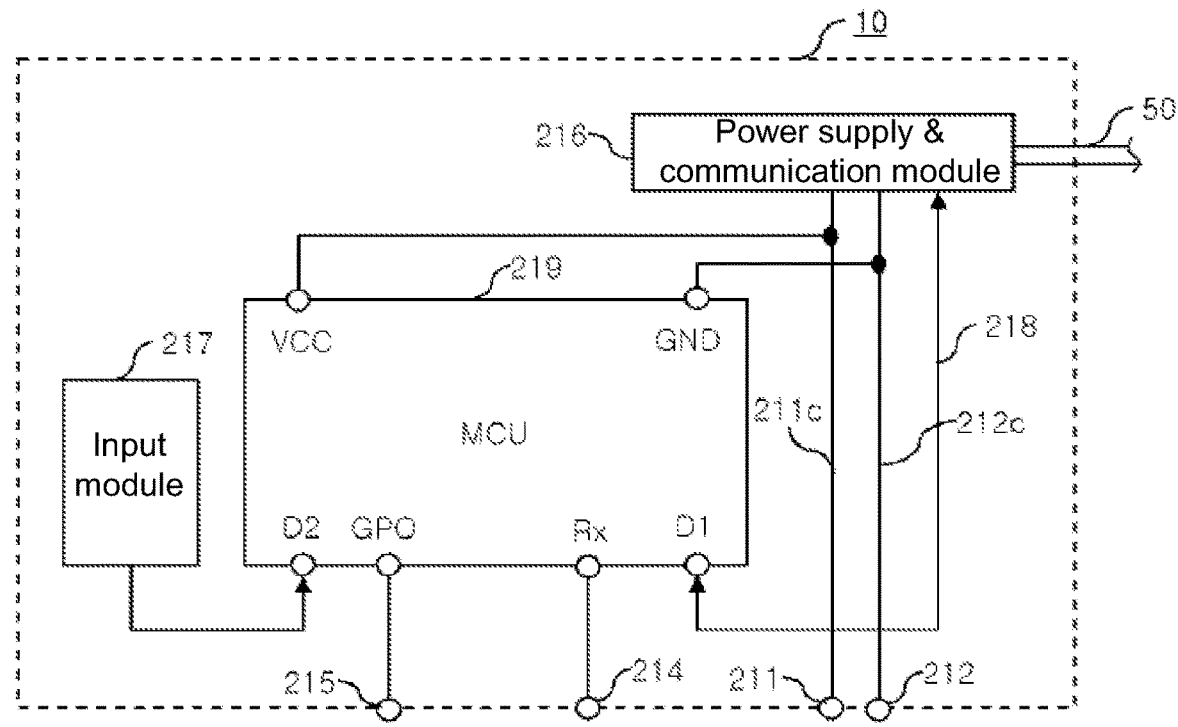
【Figure 21】
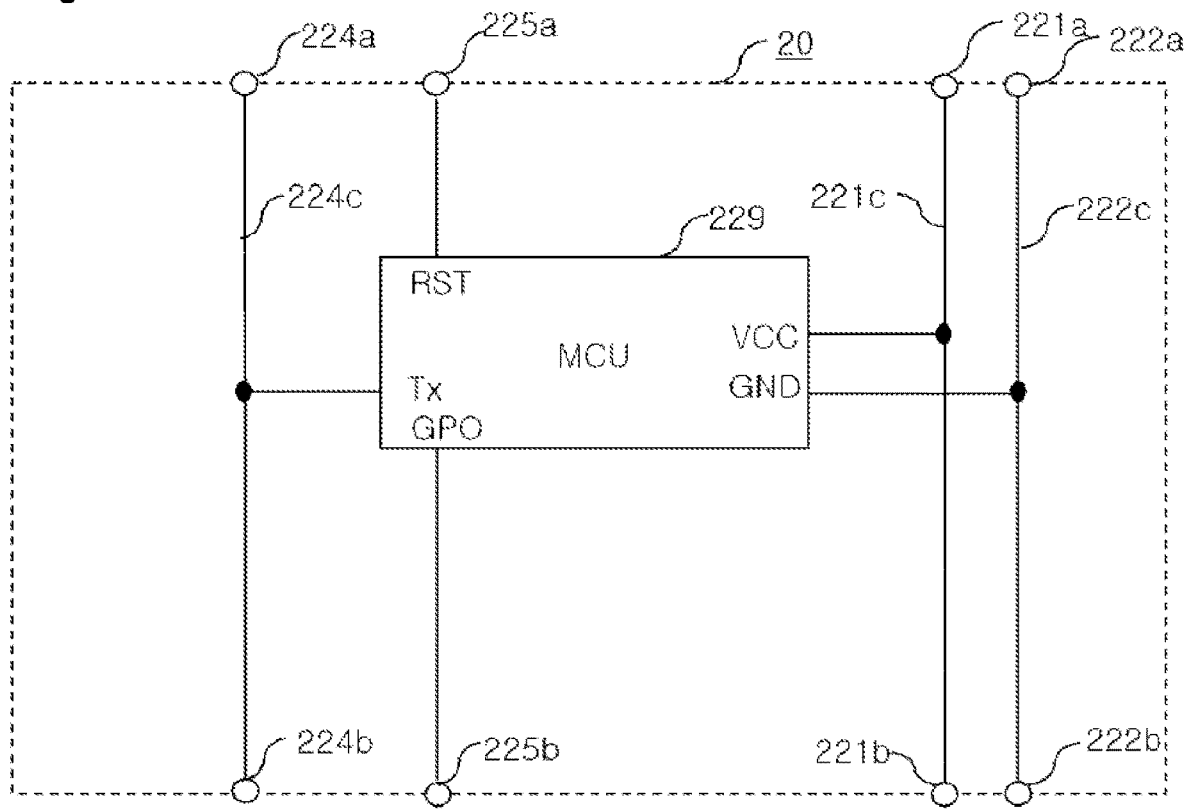

【Figure 22】
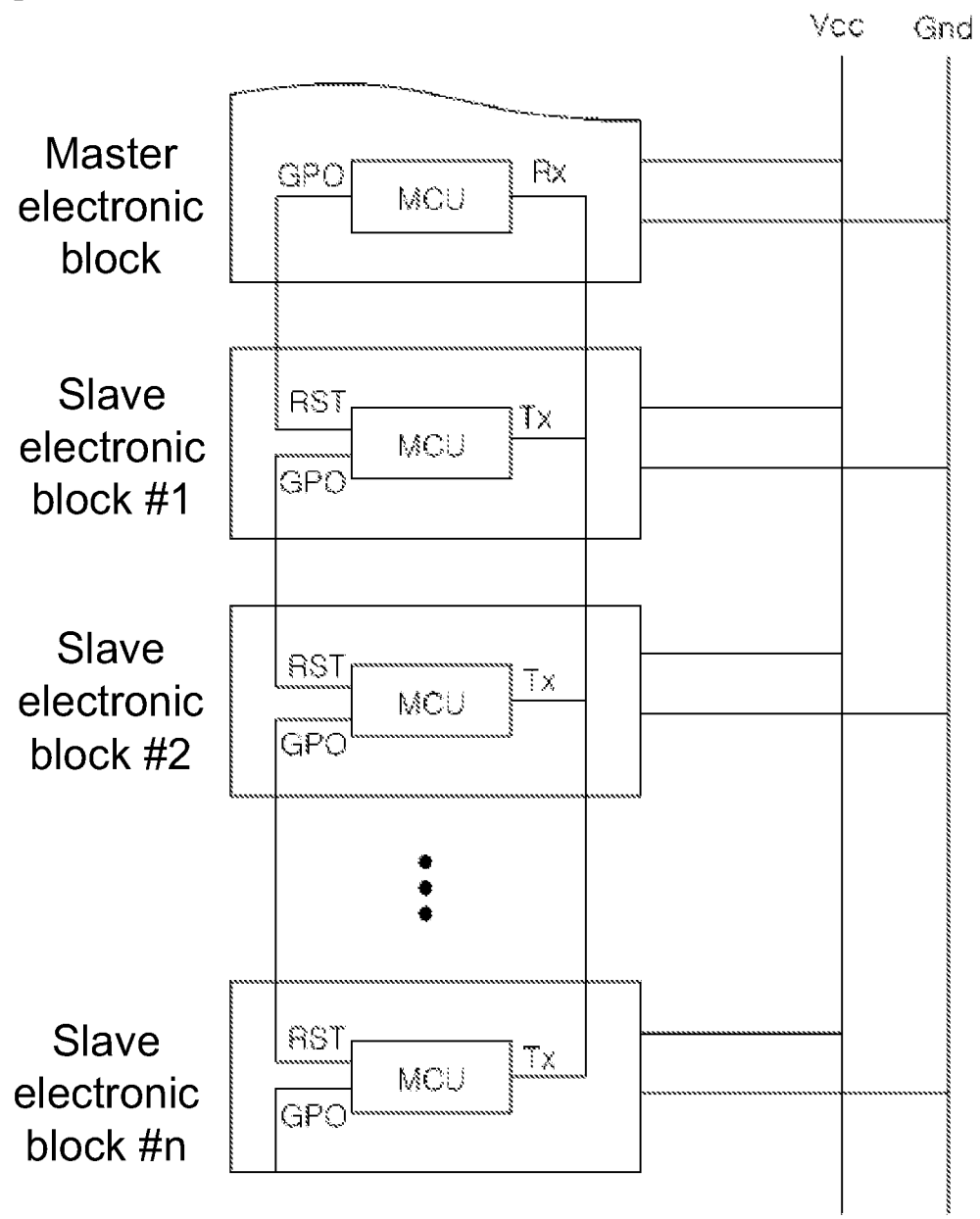

【Figure 23】
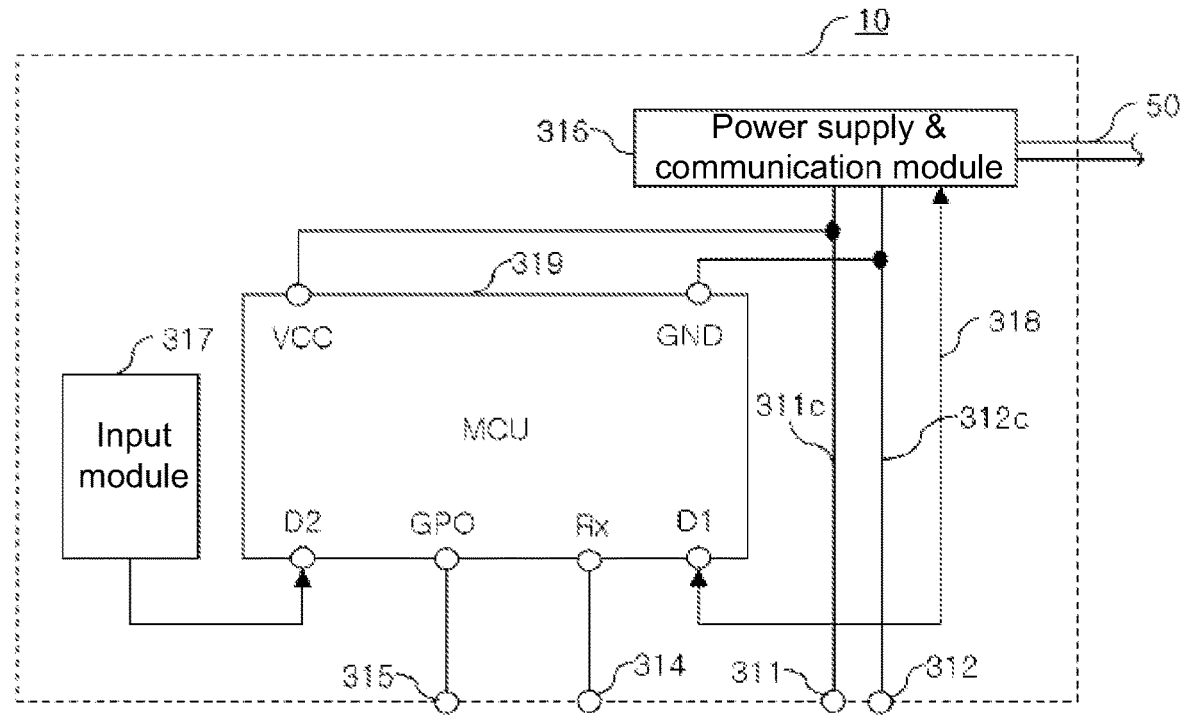
【Figure 24】
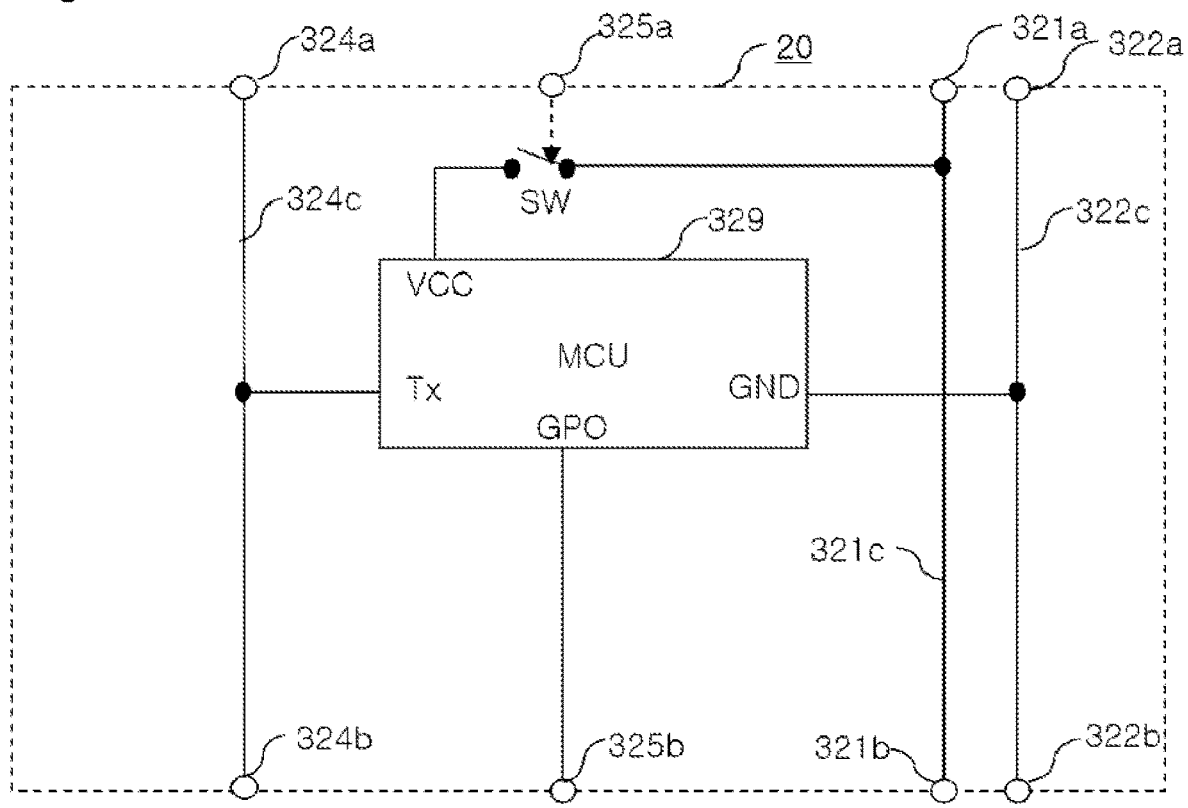

【Figure 25】
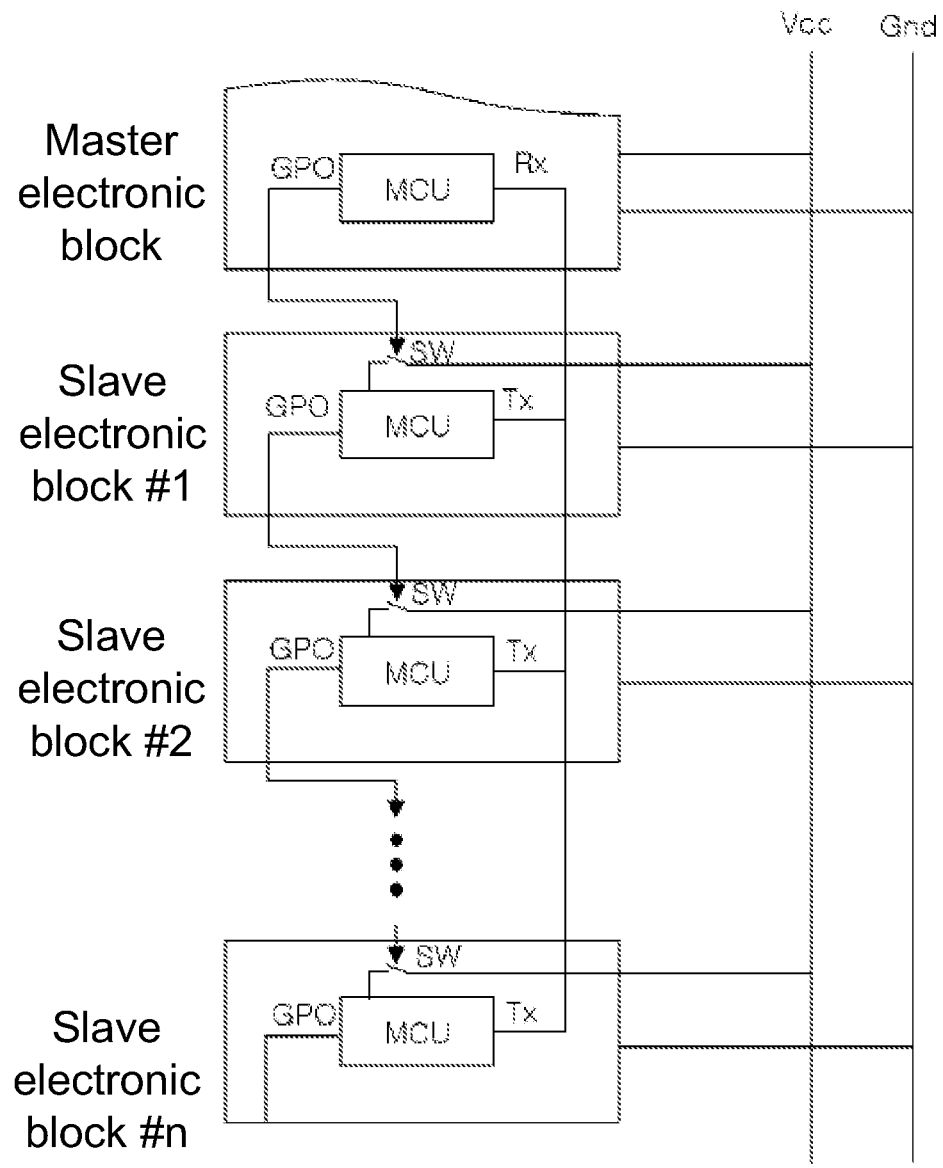

【Figure 26】
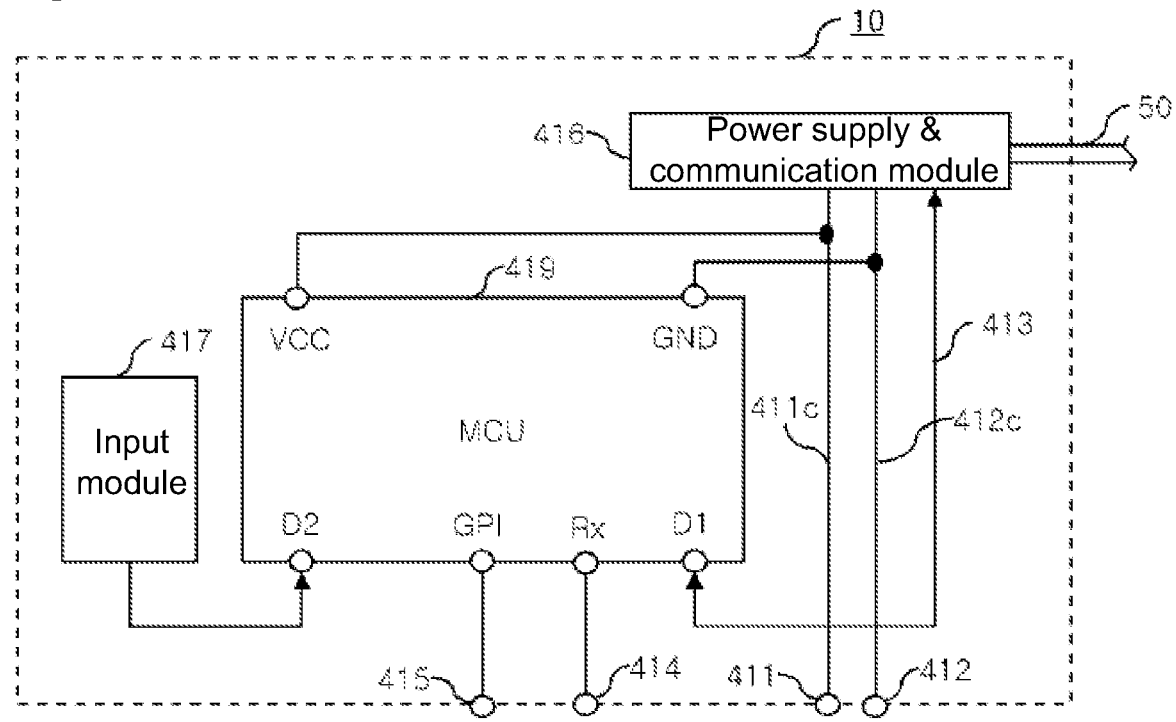
【Figure 27】
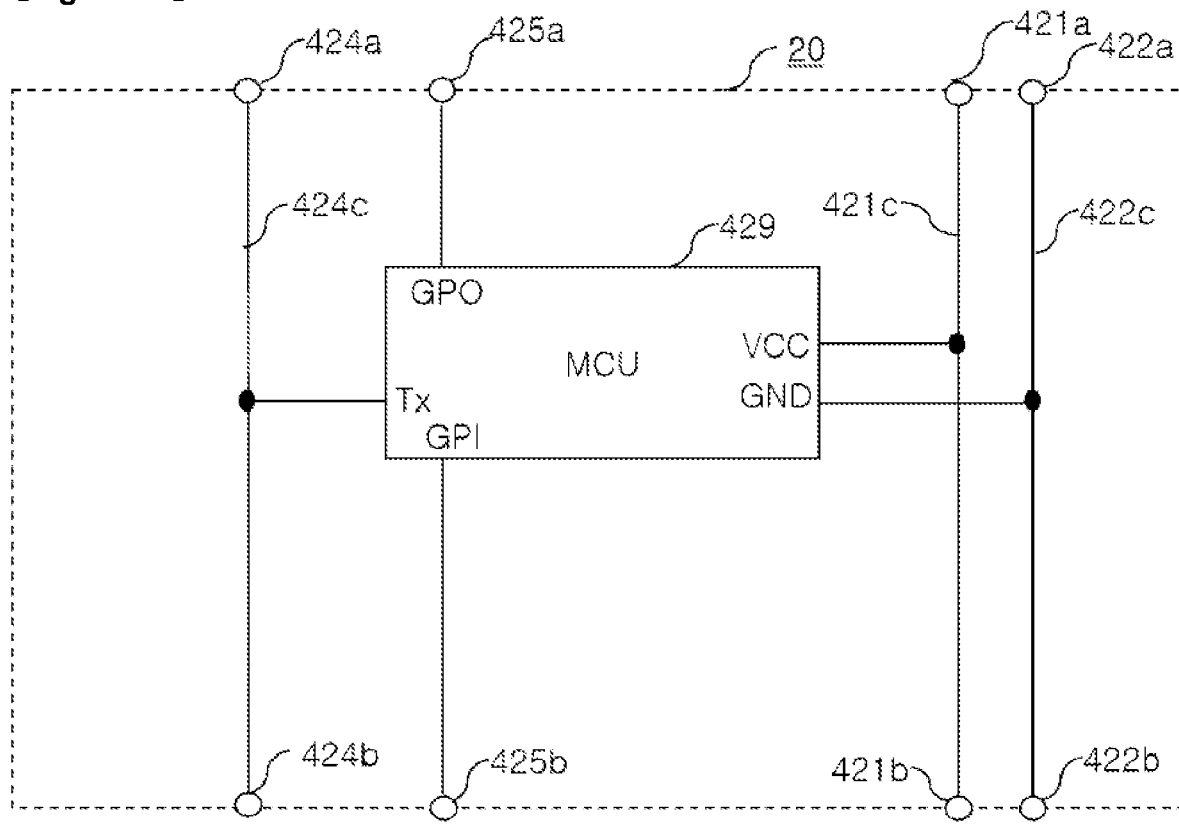

[Figure 28]
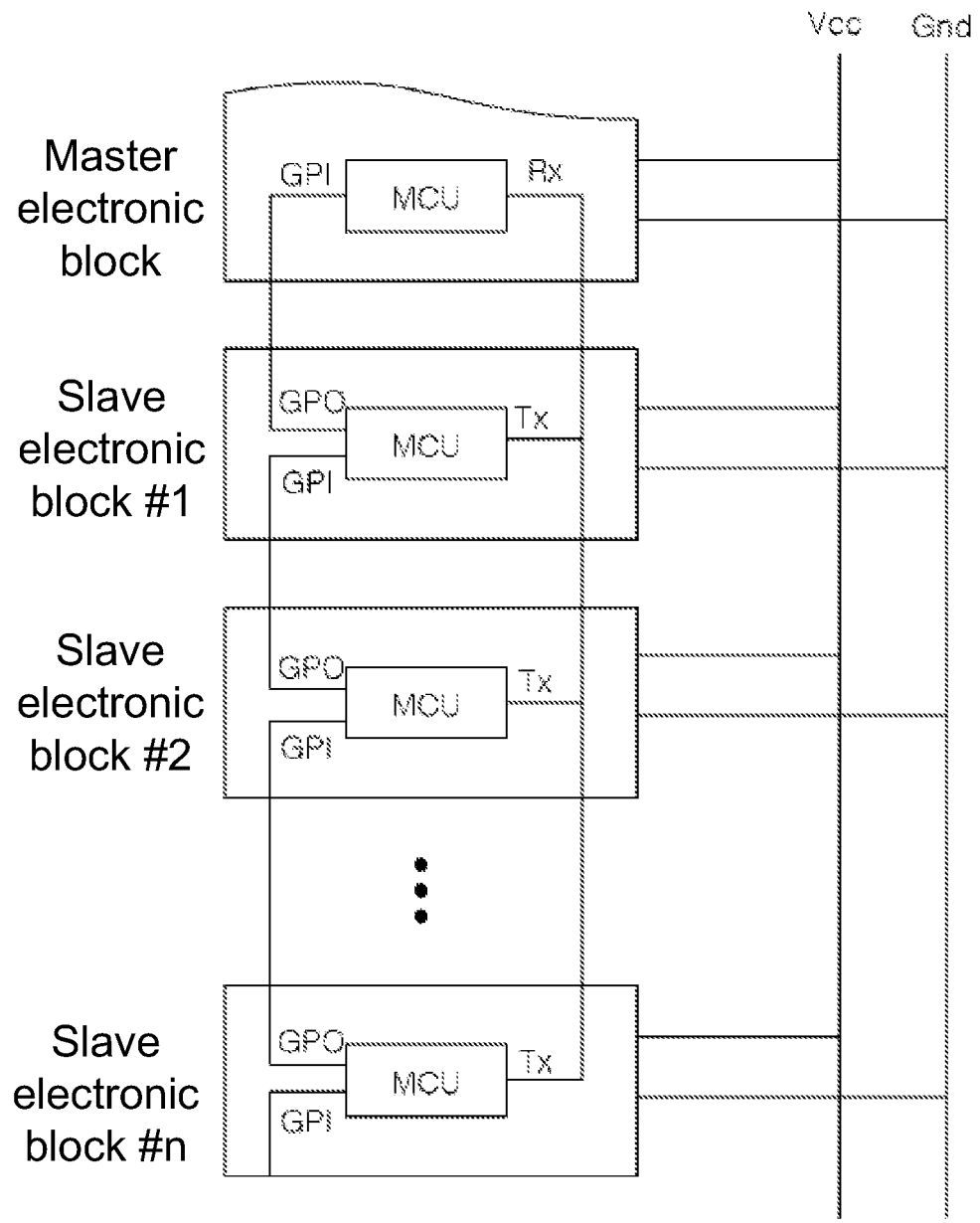

[Figure 29]
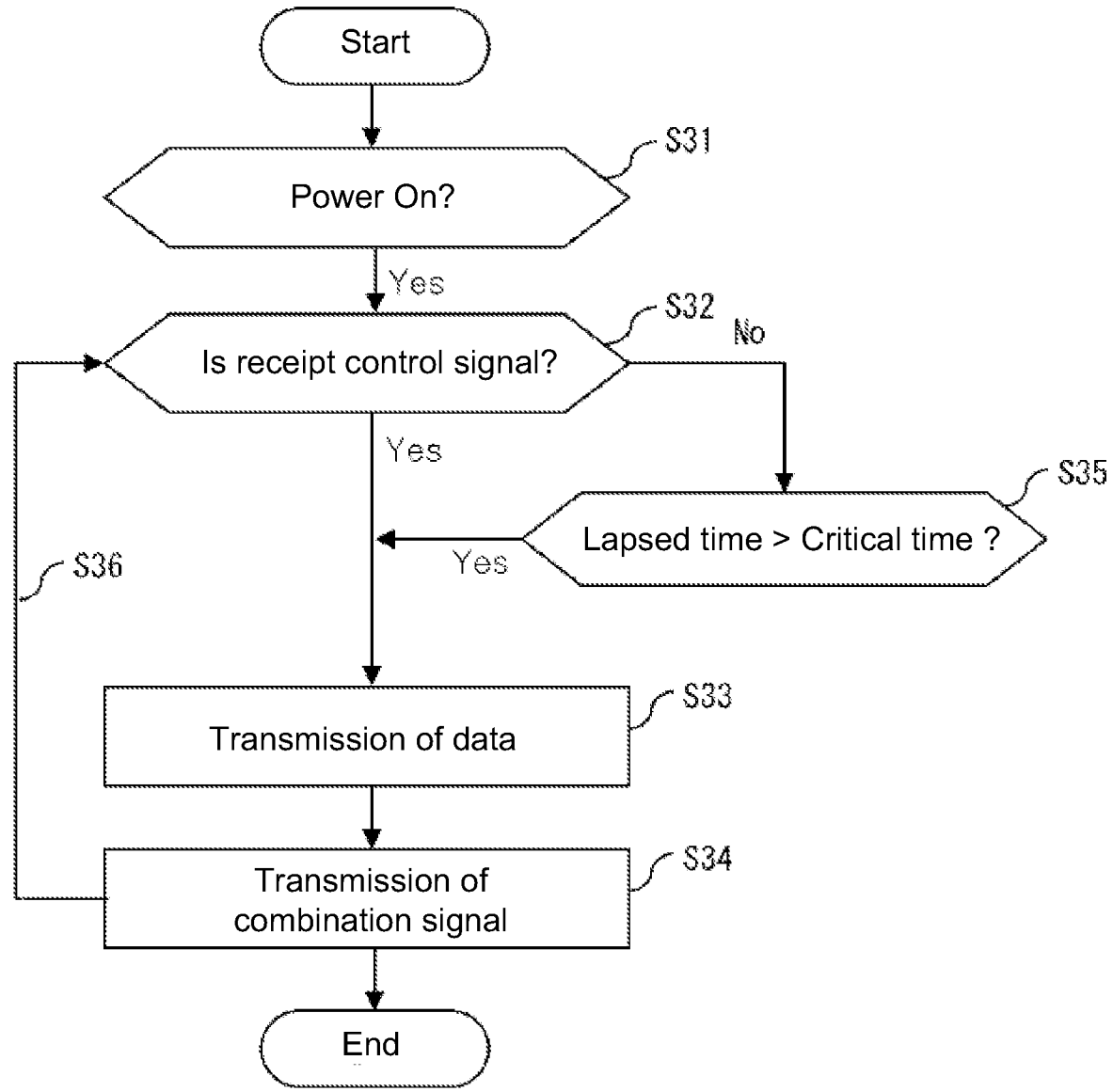

【Figure 30】
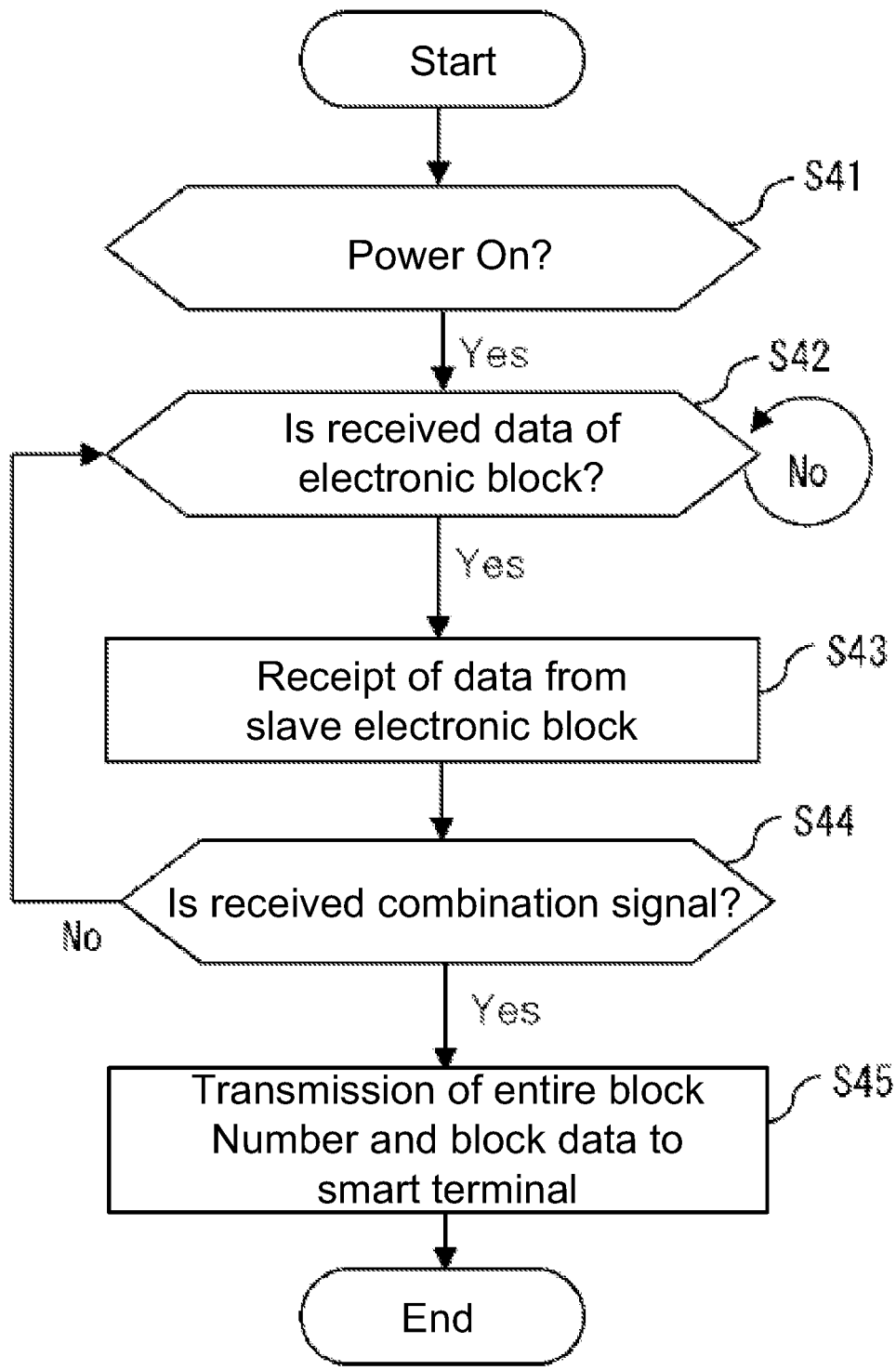

【Figure 31A】

| Sort | Basic Level | Advanced Level | Description |
|---|---|---|---|
| Event | when FLAG clicked | when FLAG clciked<br>When clapping sounds | Execute click program<br>Execute program using clapping |
| Linear Movement | ⇧ 10 steps<br>⇩ 10 steps | Move ( ) steps | Move as ( ) |
| Rotational Movement | ↪ 90 degrees<br>↩ 90 degrees<br>⟲ 360 degrees<br>⟳ 360 degrees | Turn ( ) degrees | Turn ( ) degrees |
| Sound | play sound meow<br>play sound recording<br>stop all sounds | play sound ( )<br>play sound recording ( )<br>stop all sounds | Play sound of animal, drawing or block<br>Play sound of recording ( ) |
| Data | set x to 0<br>set y to 1<br>change x by 1<br>change y by -1 | set x to ( )<br>set y to ( )<br>change x by ( )<br>change y by ( ) | Initialize variable x<br>Initialize variable y<br>Change variable x<br>Change variable y |
| Pen | pen down<br>pen up<br>clear | pen down<br>pen up<br>clear | Pen down<br>Pen up<br>Screen clear |
| Repetitive Flow Control | forever | forever | Repeat instruction forever |
| | | repeat ( ) | Repeat instruction within block until condition of ( ) |
| Conditional Flow Control | if High-Temp then<br>if Obstacle then<br>if Brightness then<br>if Darkness then<br>if Loudness then<br>[else]<br>end if | if x > ( ) then<br>if x = ( ) then<br>if x < ( ) then<br>[else]<br>end if | Compare x with value of numeral or sensor and Perform instructions according to comparison result |
| Function | | call A<br>call B<br>function A<br>function B | Call function A<br>Call function B<br>A function block<br>B function block |

【Figure 31B】

| Sort | Basic Level | Advanced Level | Description |
|---|---|---|---|
| Numeral/Variable Block (Mini) | | x, y, 1, 2, 3, 4, 5, 6, 7, 8, 10 -1, -2, -3, -4, -5, -6, -7, -8, -9 20, 30, 40, 50, 60, 70, 80, 90, 100 45, 90, 180, 270, 360 | Numeral/Variable Block |
| Sensor Block (Mini) | Temp, Sound, Light, Object | Temp, Sound, Light, Object | Sensor Block (read sensor value from 0 to 10) |
| Color Block | Yellow, Red, Green, Blue | Red, Orange color, Yellow, Green, Blue, Indigo, Purple, White (8 colors) | Color Blocks |
| Sprite | 2 servo wheels and 8 color LED | 2 servo wheels and 8 color LED | None Pen holder |
| Sprite with Pen | 2 servo wheels, 8 color LED and Pen holder | 2 servo wheels, 8 color LED and Pen holder (with Pen) | Pen holder exist |

【Figure 32A】

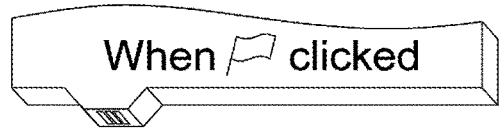

【Figure 32B】

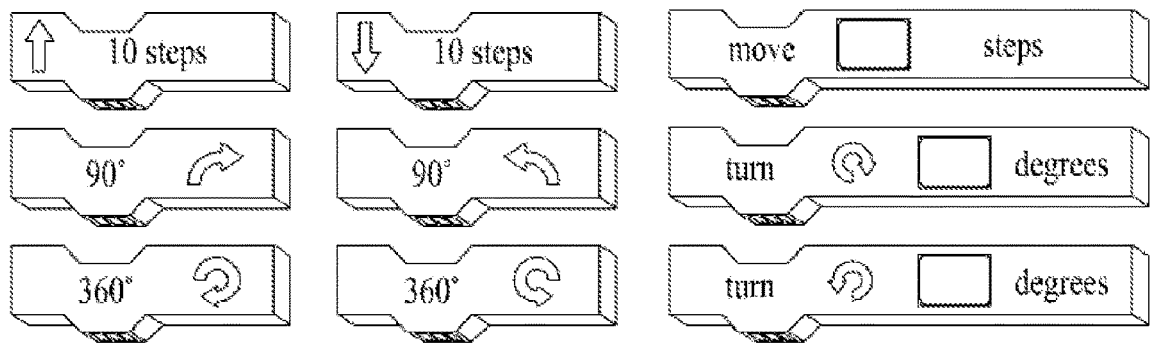

【Figure 32C】
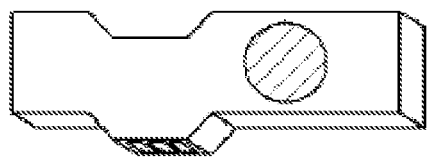
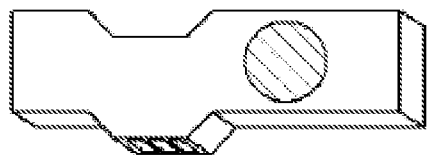
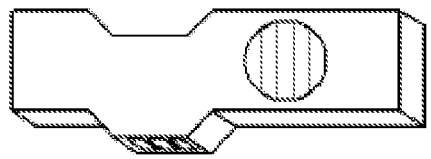
【Figure 32D】
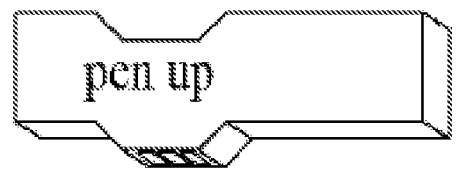
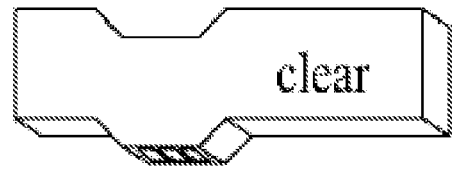

【Figure 32E】
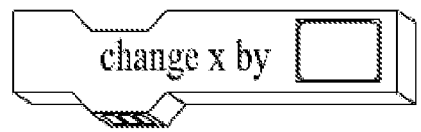
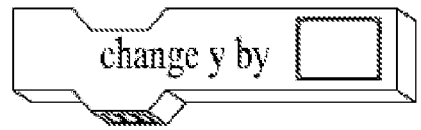
【Figure 33A】
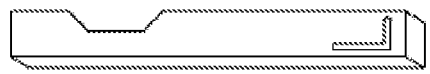
【Figure 33B】
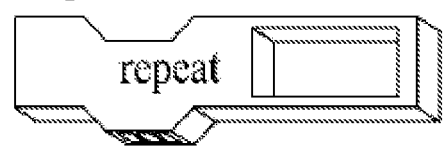
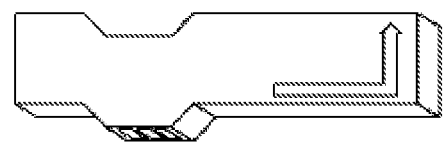

【Figure 33C】
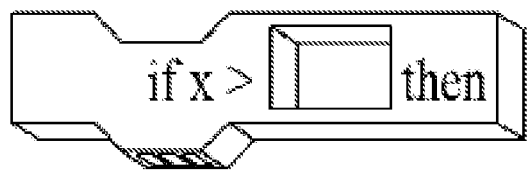
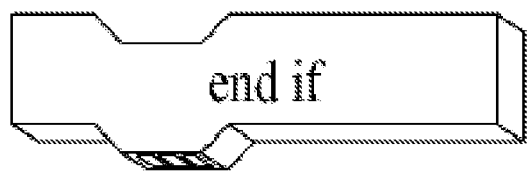
【Figure 33D】
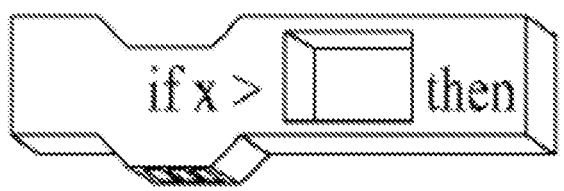
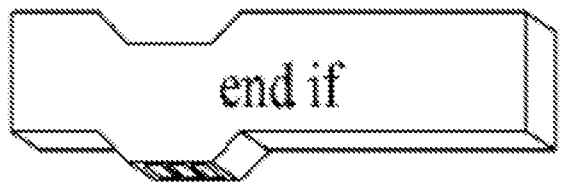

【Figure 34】
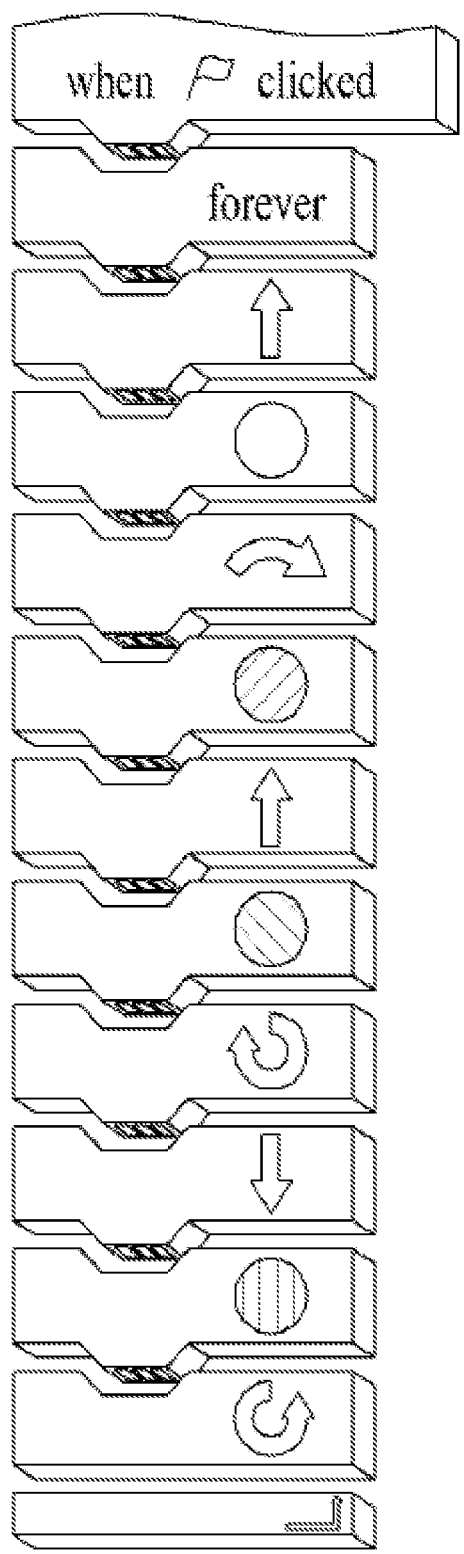

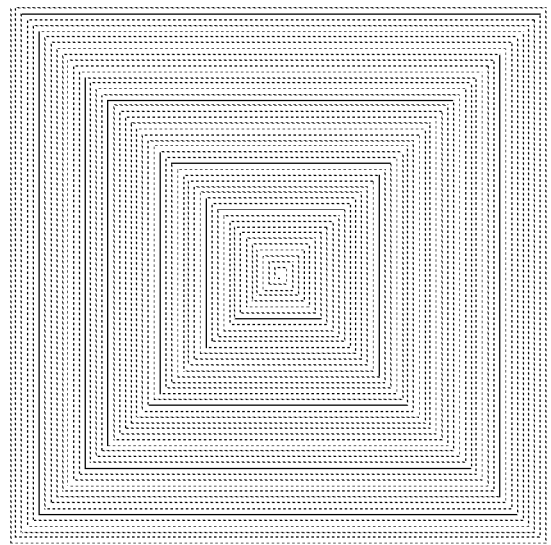
[Figure 35C]
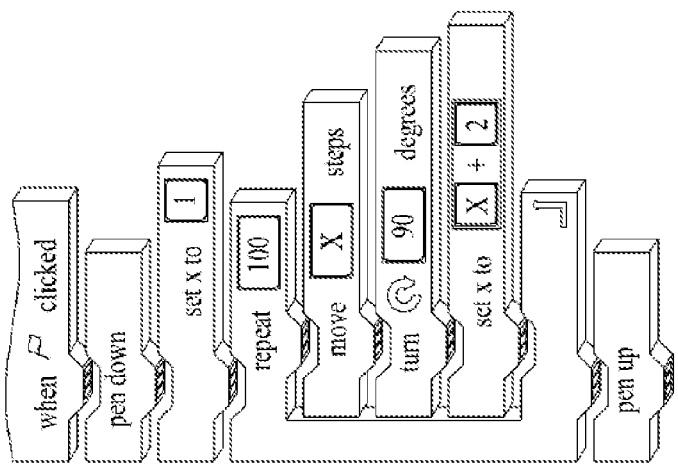
[Figure 35B]
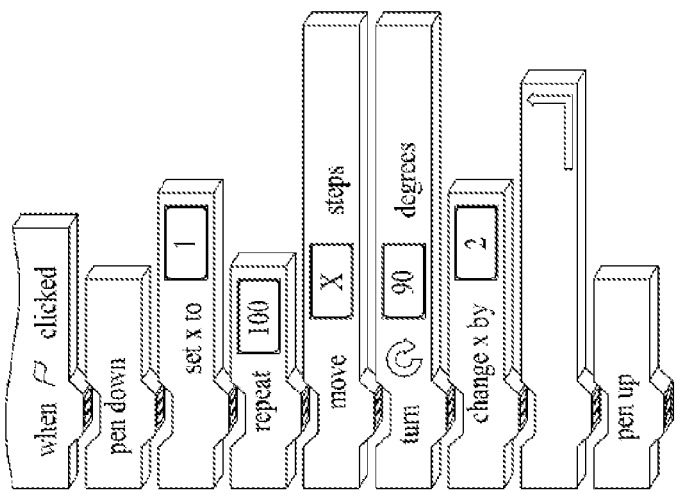
[Figure 35A]

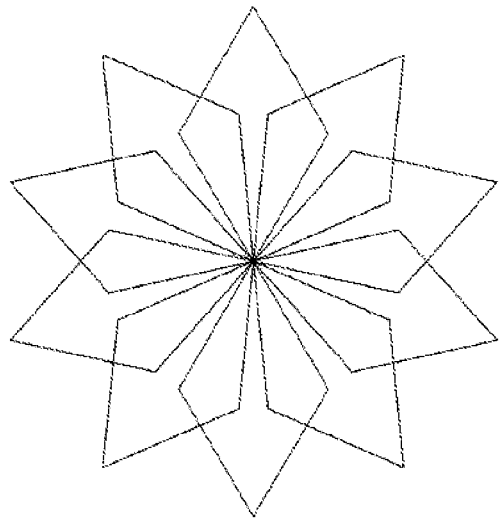
[Figure 36C]
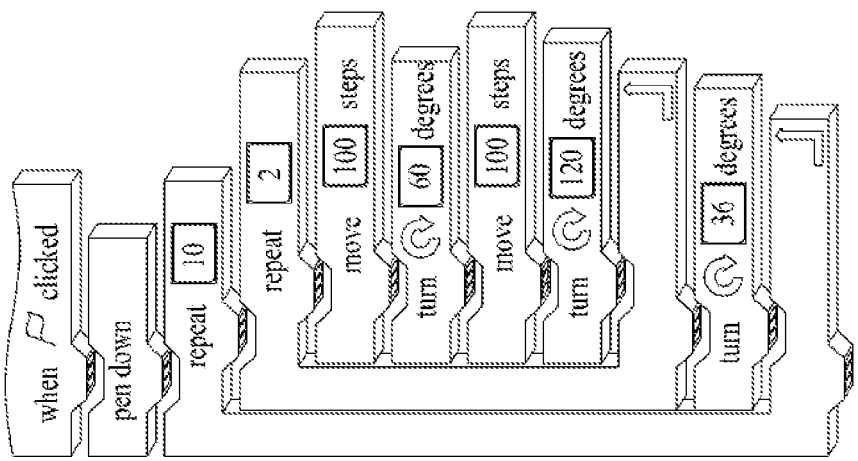
[Figure 36B]
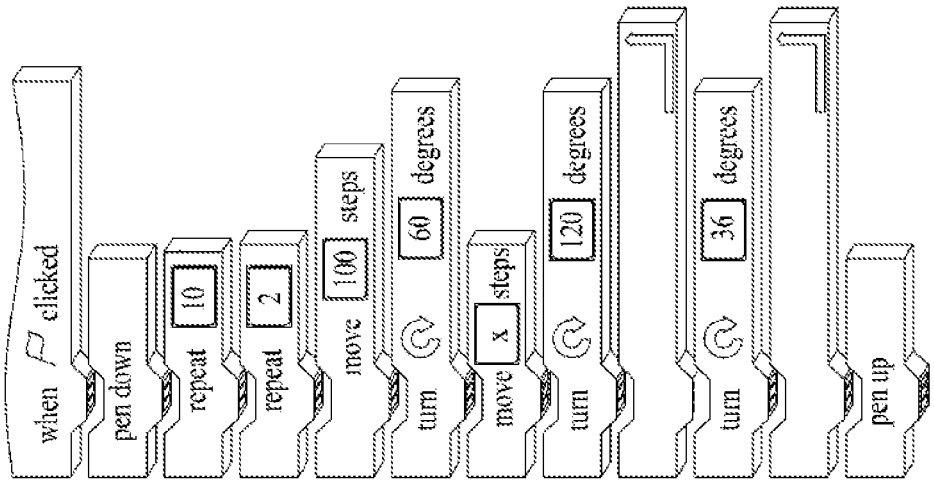
[Figure 36A]

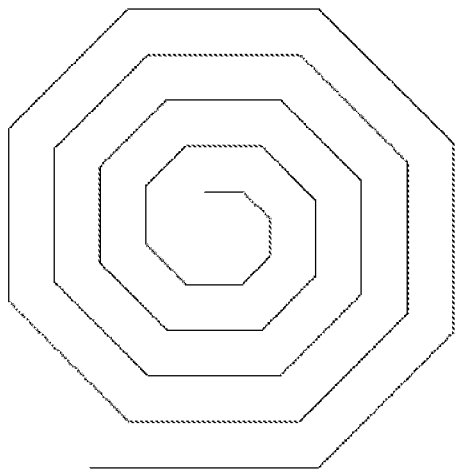
[Figure 37C]
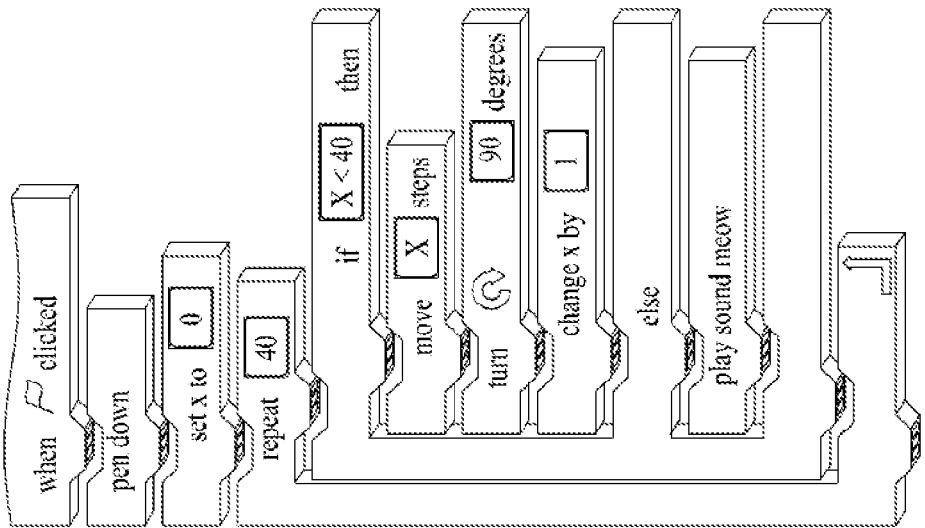
[Figure 37B]
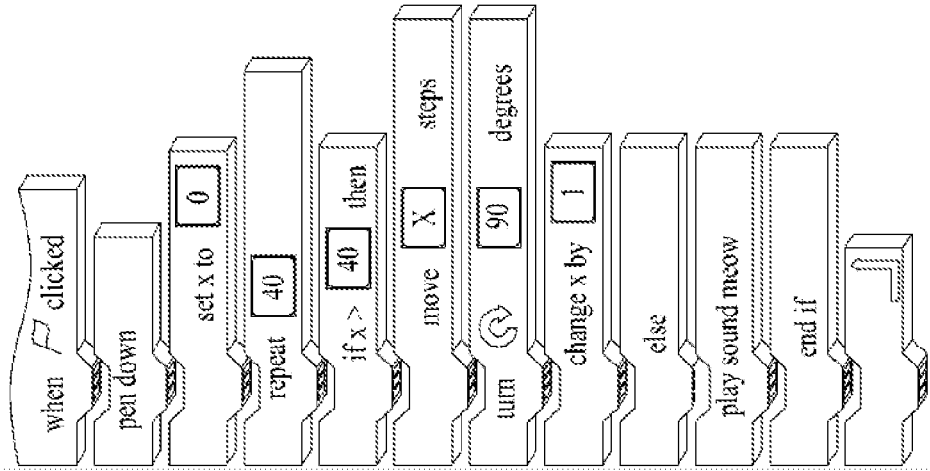
[Figure 37A]

ELECTRONIC BLOCK KIT SYSTEM FOR SCRATCH PROGRAMMING

CROSS-REFERENCE TO RELATED APPLICATIONS

This application is the U.S. National Phase under 35 U.S.C. § 371 of International Application No. PCT/KR2016/014207 filed on Dec. 6, 2016, which in turn claims the benefit of Korean Applications No. 10-2016-0025719, filed on Mar. 3, 2016 and No. 10-2016-0152771, filed on Nov. 16, 2016, the disclosures of which are incorporated by reference into the present application.

TECHNICAL FIELD

The present disclosure relates to an electronic block kit system for programming education. And more particularly, the present disclosure relates to an electronic block kit system which includes electronic blocks of hardware shapes each corresponding to instruction blocks of the scratch programming, which are used in the program coding education, and executes a program controlling a sprite in accordance with a program flow chart when the electronic blocks are connected along the program flow chart.

BACKGROUND ART

In general, a scratch program is an educational programming language which is developed a media lap of MIT (Massachusetts Institute of Technology). The scratch program provides a variety of instruction (or command) blocks which enable students using computers to control (move, activate, sound and so on) a sprite (an object being moved in a program screen of the scratch according to instructions (or commands). In other words, the scratch may be a simple script programming language. As such, each instruction (or command) included in the scratch may be embodied (or implemented) in a block shape. Therefore, a flow chart can be easily realized (or coded) by combining (or connecting) the instruction (or command) blocks.

In detail, the scratch program defines the object, which is controlled through the programming, as the sprite. Also, the scratch program includes activation instruction (or command) blocks for activating the sprite and control instruction (or command) blocks for controlling the sprite. The instruction (or command) blocks can be connected (or combined) in accordance with a single flow chart and so a programming work can be proceeded or completed. Such a programming work can allow a program controlling the sprite be created or produced.

(Referring to Patent Reference 1)

However, the above-mentioned scratch program is being provided (or distributed) only in a software shape which must be operated through the computer. Due to this, many younger children not skilled at the use of the computer hardly have the coding education using the scratch.

Therefore, it is necessary for a new technology which can create implement each instruction (or command) block of the existing scratch in a hardware shape not the software shape. In other words, it is necessary for a new technology which can create a program controlling a sprite by performing the connection of physical instruction (or command) blocks in the same way as the existing scratch program without using the computer.

DISCLOSURE

Technical Problem

Accordingly, embodiments of the present disclosure are directed to an electronic block kit system for programming education that substantially obviates one or more of problems as described above.

The embodiments relate to provide an electronic block kit system for programming education that is adapted to execute (or create) a program, which controls a sprite in accordance with a flow chart of the program, by including electronic blocks in which instruction (or command) blocks of scratch programming for program coding education are embodied in hardware shapes, and by connecting a plurality of the electronic blocks the flow chart of the program.

Technical Solution

To achieve the technical object matters, an electronic block kit system of being used for scratch programming and connected to a smart terminal according to an aspect of embodiments includes: a master electronic block connected to the smart terminal and configured to form a data communication path with the smart terminal and receive a supply voltage; and a plurality of slave electronic blocks. The slave electronic block can be combined with one of the master electronic block and a different slave electronic block. The master electronic block is disposed and the plurality of slave electronic blocks are cascade-combined to a lower portion of the master electronic block. The slave electronic block forms the data communication path with one of the master electronic block and the different slave electronic block, which is combined with an upper portion of the slave electronic block, and receives the supply voltage from the combined upper electronic block.

In the electronic block kit system for scratch programming according to an aspect of embodiments, each of the master electronic block and the slave electronic blocks does not occupy the data communication path when a combination signal is received from the different slave electronic block combined with one's own lower portion, and not only occupies the data communication path but also transmits one's own electronic block identification data when a combination signal is not received from the different slave electronic block combined with one's own lower portion.

Also, the electronic block kit system for scratch programming according to an aspect of embodiments allows each of the slave electronic blocks to intercept the combination signal being applied to one of the master electronic block and the different slave electronic block which is combined with one's own upper portion after the slave electronic block occupies the data communication path and transmits one's own electronic block identification data.

The electronic block kit system for scratch programming according to an aspect of embodiment enables each of the slave electronic blocks to intercept the combination signal being applied to one of the master electronic block and the different slave electronic block, which is combined with one's own upper portion, in response to an interception instruction received through the data communication path after the slave electronic block occupies the data communication path and transmits one's own electronic block identification data.

In the electronic block kit system for scratch programming according to an aspect of embodiments, each of the master electronic block and the slave electronic blocks occupies the data communication path and performs the data communication regardless of the combination signal when an occupation start signal is received through the data communication path.

The electronic block kit system for scratch programming according to an aspect of embodiments further includes an optional electronic block inserted into the slave electronic block and configured to output an option value. When the option value is received from the optional electronic block, the slave electronic block adds the received option value to the identification data and transmits the identification data including the option value.

In the electronic block kit system for scratch programming according to an aspect of embodiments, the optional electronic block receives the supply voltage from the slave electronic block and applies a divided voltage, which varies along a division rate of an internal resistor divider, to the slave electronic block.

Effects of the Invention

As described above, the electronic block kit system for programming education in accordance with embodiments of the present disclosure can connect the electronic blocks, which are touched with a human's hand, with one another and allow the scratch programming to be easily performed. Therefore, a program controlling a sprite can be easily programmed without any computer.

BRIEF DESCRIPTION OF THE DRAWINGS

FIG. 1 is a block diagram showing the configuration of an electronic block kit system for a programming education in accordance with an embodiment of the present disclosure.

FIG. 2 is a perspective view showing a configuration example of the electronic block kit system for the programming education in accordance with an embodiment of the present disclosure.

FIG. 3 is a perspective view showing an external shape structure of the master electronic block in accordance with a first embodiment of the present disclosure.

FIG. 4 is a circuitry diagram showing an internal configuration of the master electronic block in accordance with a first embodiment of the present disclosure.

FIG. 5 is a circuitry diagram showing an internal configuration of the control module in accordance with a first embodiment of the present disclosure.

FIG. 6 is a perspective view showing an external shape structure of the slave electronic block in accordance with a 1-1st embodiment of the present disclosure.

FIG. 7 is a circuitry diagram showing an internal configuration of the slave electronic block in accordance with a 1-1st embodiment of the present disclosure.

FIG. 8 is a circuit diagram showing a supply voltage path and a data communication path when a master electronic block and slave electronic blocks are combined with one another in accordance with a first embodiment of the present disclosure.

FIG. 9 is a flow chart illustrating an operation procedure of the control module of the slave electronic block in accordance with a first embodiment of the present disclosure.

FIG. 10 is a flow chart illustrating an operation procedure of the control module of the master electronic block in accordance with a first embodiment of the present disclosure.

FIG. 11 is a perspective view showing an external shape structure of the slave electronic block in accordance with a 1-2nd embodiment of the present disclosure.

FIG. 12 is a circuitry diagram showing an internal configuration of the slave electronic block in accordance with a 1-2nd embodiment of the present disclosure.

FIG. 13 is a perspective view illustrating a process of inserting an optional electronic block into a slave electronic block in accordance with a first embodiment of the present disclosure.

FIG. 14 is a diagram showing examples of the optional electronic block in accordance with a first embodiment of the present disclosure.

FIG. 15 is a circuitry diagram showing an internal configuration of the optical electronic block in accordance with a first embodiment of the present disclosure.

FIG. 16 is a circuit diagram showing an internal configuration of the combined slave and optional electronic blocks in accordance with a first embodiment of the present disclosure.

FIG. 17 is a circuitry diagram showing an internal configuration of the master electronic block in accordance with a second embodiment of the present disclosure.

FIG. 18 is a circuitry diagram showing an internal configuration of the slave electronic block in accordance with a second embodiment of the present disclosure.

FIG. 19 is a circuit diagram showing a supply voltage path and a data communication path when a master electronic block and slave electronic blocks are combined with one another in accordance with a second embodiment of the present disclosure.

FIG. 20 is a circuitry diagram showing an internal configuration of the master electronic block in accordance with a third embodiment of the present disclosure.

FIG. 21 is a circuitry diagram showing an internal configuration of the slave electronic block in accordance with a third embodiment of the present disclosure.

FIG. 22 is a circuit diagram showing a supply voltage path and a data communication path when a master electronic block and slave electronic blocks are combined with one another in accordance with a third embodiment of the present disclosure.

FIG. 23 is a circuitry diagram showing an internal configuration of the master electronic block in accordance with a fourth embodiment of the present disclosure.

FIG. 24 is a circuitry diagram showing an internal configuration of the slave electronic block in accordance with a fourth embodiment of the present disclosure.

FIG. 25 is a circuit diagram showing a supply voltage path and a data communication path when a master electronic block and slave electronic blocks are combined with one another in accordance with a fourth embodiment of the present disclosure.

FIG. 26 is a circuitry diagram showing an internal configuration of the master electronic block in accordance with a fifth embodiment of the present disclosure.

FIG. 27 is a circuitry diagram showing an internal configuration of the slave electronic block in accordance with a fifth embodiment of the present disclosure.

FIG. 28 is a circuit diagram showing a supply voltage path and a data communication path when a master electronic block and slave electronic blocks are combined with one another in accordance with a fifth embodiment of the present disclosure.

FIG. 29 is a flow chart illustrating an operation procedure of the control module of the slave electronic block in accordance with a fifth embodiment of the present disclosure.

FIG. 30 is a flow chart illustrating an operation procedure of the control module of the master electronic block in accordance with a fifth embodiment of the present disclosure.

FIGS. 31A and 31B provide tables which each represent programming instruction (or command) units in accordance with an embodiment of the present disclosure.

FIGS. 32A, 32B, 32C, 32D, and 32E provide perspective views showing examples of the electronic blocks in accordance with embodiments of the present disclosure.

FIGS. 33A, 33B, 33C and 33D provide perspective views showing examples of the electronic blocks for flow control in accordance with an embodiment of the present disclosure.

FIG. 34 is a diagram illustrating a program which moves and rotates a sprite and simultaneously changes color of an LED (Light Emitting Diode).

FIGS. 35A, 35B and 35C are diagrams illustrating an exercise program which draws tetragonal spiral. FIG. 35A is a diagram showing a block connection example of the tetragonal spiral drawing program.

FIG. 35B is a diagram showing the tetragonal spiral drawing program which is coded (or programmed) using a scratch program. FIG. 35C is a diagram showing an execution resultant of the tetragonal spiral drawing program.

FIGS. 36A, 36B and 36C are diagrams illustrating an exercise program which draws a single snow flower. FIG. 36A is a diagram showing a block connection example of the single-snow-flower drawing program.

FIG. 36B is a diagram showing the single-snow-flower drawing program which is coded (or programmed) using a scratch program. FIG. 36C is a diagram showing an execution resultant of the single-snow-flower drawing program.

FIGS. 37A, 37B and 37C are diagrams illustrating an exercise program which draws an octagonal spiral. FIG. 37A is a diagram showing a block connection example of the octagonal spiral drawing program.

FIG. 37B is a diagram showing the octagonal spiral drawing program which is coded (or programmed) using a scratch program. FIG. 37C is a diagram showing an execution resultant of the octagonal spiral drawing program

DETAILED DESCRIPTION OF THE EMBODIMENTS

Reference will now be made in detail to the embodiments of the present disclosure referring to the accompanying drawings.

Wherever possible, the same reference numbers will be used throughout the disclosure including the drawings to refer to the same or like parts. As such, the repeatable description of the same or like parts will be omitted.

The configuration of an electronic block kit system for programming education in accordance with a first embodiment of the present disclosure will now be described with reference to FIGS. 1 and 2.

Referring to FIGS. 1 and 2, the electronic block kit system for the programming education in accordance with the embodiment of the present disclosure may include a smart terminal 60 having a computing function and a display function, a master electronic block 10 connected to the smart terminal 60, slave electronic blocks 20 combinable with the master electronic block 20 and one another, and a program execution tool 70 installed in the smart terminal 60. Also, the electronic block kit system may include a communication unit 50 connecting the smart terminal 60 and the master electronic block 10 and allowing the smart terminal 60 and the master electronic to communicate with each other. The electronic block kit system may further include a sprite device 80 being driven through communication with the smart terminal 60. Furthermore, the electronic block kit system may include optional electronic blocks 30 which are built in the respective slave electronic blocks 20 and establish optional valves the respective slave electronic blocks 20.

The smart terminal 60 may be a terminal, such as a smart phone, a tablet personal computer, a phablet, a PDA (Personal digital assistance) or others, having the computing function and the display function. As such, the smart terminal 60 can install programs and execute the installed programs. Also, the smart terminal 60 having a display device can display executed resultants and so on onto a screen of the display device.

The master electronic block 10 may be implemented in a combinable shape and combined with another component. In detail, the master electronic block 10 may be combined with one slave electronic block 20. To this end, the master electronic block 10 may include a combination portion which is disposed in a lower portion of the master electronic block 10 and combined with a different electronic block (i.e., the slave electronic block 20). Also, the master electronic block 10 may be connected to the smart terminal 60 and perform a data communication with the smart terminal 60.

The slave electronic block 20 may be implemented in a combinable shape and combined with other components. In detail, the slave electronic block 20 may be combined with at most two different electronic blocks 10 and/or 20. To this end, the slave electronic block 20 may include two combination portions which are disposed in lower upper portions of the slave electronic block 20 and each combined with the different electronic block 10 or 20.

Therefore, one slave electronic block 20 can be combined with the lower portion of the master electronic portion 10 and another slave electronic block 20 can be combined with the lower portion of the combined slave electronic block 20. In this manner, the plurality of slave electronic blocks 20 can be continuously (or sequentially) combined with one another.

In other words, the master electronic block 10 and the plurality of slave electronic blocks 20 can be combined with one another in a cascade shape. The cascade-combined configuration of the master and slave electronic blocks 10 and 20 realizes a single programmed flow chart. Consequently, a flow chart of the cascade-combined configuration can become a flow chart controlling an object or a sprite. Also, each of the master and slave electronic blocks 10 and 20 corresponds to a block which means an instruction (or command) for controlling the sprite. As such, the master and slave electronic block 10 and 20 can control operation, color, frequency, and execution sequence of the sprite and so on.

The optional electronic block 30 may be combined with the slave electronic block 20 in a built-in shape. Also, the optional electronic block 30 may be fixed by an optional value. For example, the optional value of the optional electronic block 30 may become a numeral value. In this case, the numeral value may be set as the optional value when the optional electronic block 30 is built-in the slave electronic block 20.

The communication unit 50 connects the master electronic block 10 and the smart terminal 60 with each other and performs a data communication between the master electronic block 10 and the smart terminal 60. Such a communication unit 50 may be implemented in a commercial wired cable mode. As such, the communication unit 50 may include one of USB (Universal Serial Bus), micro USB and so on. In another manner, the communication unit may be implemented in one of radio and short-range wireless communication modes. In this case, the communication unit 50 may include one of Bluetooth unit, WiFi unit, IR (Infrared Ray) communication unit, RF (Radio Frequency) communication unit and so on.

The program execution tool 70 may be an application software or a mobile phone application software which is called as "Appl" or "App". The program execution tool 70 may sense (or detect) the master electronic block 10 and the slave electronic blocks 20, which are cascade-connected to the master electrode block 10, through the communication unit 50 connected between the smart terminal 60 and the master electronic block 10. Also, the program execution tool 70 perceives the programmed flow chart on the basis of the cascade-combined configuration of the sensed (or detected) electronic blocks 10 and 20. Moreover, the program execution tool 70 controls the object or the sprite in accordance with the perceived program flow chart. In addition, the program execution tool 70 displays the object or the sprite on a display screen of the smart terminal 60. Furthermore, the program execution tool 70 controls the operation of the sprite on the display screen of the smart terminal 60 in accordance with the perceived program flow chart.

In this manner, the program execution tool 70 can control the sprite device 80, which is connected with the smart terminal 60 in one of wire and wireless modes, to be driven. In other words, the program execution tool 70 can control the physical sprite device 80 to be driven along with the perceived program flow chart.

The sprite device 80 may include a movement module (or a driving module) and a communication module. As such, the sprite device 80 can communicate with the smart terminal 60. Also, the sprite device 80 can move (or be driven) in accordance with a control instruction (or command) received from the smart terminal 60. In other words, the sprite device 80 may become a real device obtained to implement (or realize) the software sprite, which is controlled on the display screen of the smart terminal 60, using physical substances (or materials). For example, the sprite device 80 may become a remote-controlled model (or toy) vehicle which includes wheels, motor and so on. As another example, the sprite device 80 may become a device or robot performing a desired operation.

Continuously, the configuration of the master electronic block 10 in accordance with a first embodiment of the present disclosure will be described in detail with reference to FIGS. 3 and 4. FIG. 3 is a perspective view showing an external shape structure of the master electronic block 10. FIG. 4 is a circuitry diagram showing an internal configuration of the master electronic block 10.

Referring to FIG. 3, the master electronic block 10 in accordance with an embodiment of the present disclosure includes a body 10a and a combination portion 10b formed in a lower surface of the body 10a. An instruction (or command) phrase consisting of a character string is displayed on a surface of the body 10a, in order to easily recognize the function or instruction (or command) of the master electronic block 10. The instruction (or command) phrase of the character string may be represented with one of English alphabet, Korean alphabet and so on.

The combination portion 10b can be used as a combination means capable of being combined with a different electronic block, i.e., the slave electronic block 20. For example, the combination portion 10b can be formed in a protrusive shape which is protruded from the lower surface of the body 10a. As such, the protrusive combination portion 10b can be combined (or engaged) with a combination portion (or a combination groove (or concave)) of the slave electronic block 20 which is formed in a groove (or concave) shape. In another manner, the combination portion 10b of the master electronic block 10b can be formed in a combination groove (concave) and combined with a protrusive combination portion of the slave electronic block 20. Moreover, the combination portion 10b can include a plurality of sub combination portions which are formed in several regions of the lower surface of the body 10a. In other words, the combination portion 10b can include a plurality of protrusions or combination grooves (or concaves).

Also, an USB connector, a micro USB connector, an exclusive connector or others connected or connectable with the communication unit 50 can be formed on a side surface of the body 10a of the electronic block. In another manner, the master electronic block 10 and the smart terminal 60 can be connected with each other in a short range communication mode such as Bluetooth, IR, WiFi or others. In this case, the above-mentioned connector connected with the separated communication unit 50 can be removed.

As shown in FIG. 4, the master electronic block 10 in accordance with an embodiment of the present disclosure may include: a high voltage tap 11 connected to a high voltage source Vcc; a low voltage tap 12 connected to a low voltage source Gnd; a clock tap 13 for transmitting and receiving a clock signal; a data tap 14 for transmitting and receiving data; and a control signal transmitting tap 15 transmitting a control signal to a combined different-electronic block. Also, the master electronic block 10 may include: a power supply and communication module 16 connected to the communication unit 50; and a control module 19 including an MCU (Micro Controller Unit). The master electronic block 10 may further include an input module 17 perceiving a signal from an input element such as a button, a sensor or others.

The power supply and communication module 16 may be connected with the communication unit 50. As such, the power supply and communication module 16 may transmit and receive data. Also, the power supply and communication module 16 may receive a supply voltage and apply the received supply voltage to the control module 19 and the high voltage tap 11 and the low voltage tap 12.

Also, the power supply and communication module 16 can include a built-in battery or a built-in supply voltage source. For example, when the communication unit 50 communicates in a wireless mode, the power supply and communication module 16 may receive the supply voltage from the built-in battery and the built-in supply voltage source not the communication unit 50.

The high voltage tap 11, the low voltage tap 12, the clock tap 13, the data tap 14 and the control signal transmitting tap 15 may be disposed on the surface of the combination portion 10b formed the lower surface of the master electronic block 10. As such, the high voltage tap 11, the low voltage tap 12, the clock tap 13, the data tap 14 and the control signal transmitting tap 15 can be connected with the respective taps of the slave electronic block 20 when the combination portion 10b is combined with the slave electronic block 20.

If the combination portion 10b includes the plurality of sub combination portions, the high voltage tap 11, the low voltage tap 12, the clock tap 13, the data tap 14 and the control signal transmitting tap 15 can be dispersedly disposed in the plurality of sub combination portions.

The high voltage tap 11 and the low voltage tap 12 are used as voltage taps for transmitting the supply voltage. The high and low voltage taps 11 and 12 are connected to a high voltage line 11c and a low voltage line 12c. The high voltage line 11c and the low voltage line 12c may be connected to the communication unit 50 through the power supply and communication module 16, in order to receive the supply voltage. As such, the high voltage tap 11 and the low voltage tap 12 may apply the supply voltage to a different electronic block 20 which will be connected with their own electronic block. Also, the high voltage line 11c and the low voltage line 12c are connected to the control module 19 and apply the supply voltage to the control module 19. Therefore, the plurality of electronic blocks 10 and 20 cascade-connected with one another can receive the supply voltage in a parallel connection mode through the high voltage line 11c and low voltage line 12c. For the convenience of explanation, the high voltage line 11c and the low voltage line 12c will be unifiedly called as a voltage path and used mixedly with the voltage path. Also, the high voltage tap 11 and the low voltage tap 12 will be unifiedly called as a voltage port and used mixedly with the voltage port.

The clock tap 13 and the data tap 14 may be used as taps for transmitting a clock signal and a data signal. In other words, the clock tap 13 and the data tap 14 may be taps for a serial communication. Preferably, the communication taps 13 and 14 may be taps for a serial communication of an Inter Integrated Circuit (I2C) mode. In other words, the communication taps 13 and 14 may be used as taps for transmitting and receiving a serial clock (SCL) signal and a serial data (SDA) signal. As such, the data may be transmitted through a SDA line in synchronization with the serial clock (SCL) signal.

Such clock tap 13 and data tap 14 may be connected to not only a lower electronic block 20, which is connected with a lower portion of their own electronic block, but also input/output pins SCL and SDA of the control module 19 such as the MCU. As such, the control module 19 such as the MCU may perform a serial communication with the lower electronic block 20 through the input/output pins SCL and SDA. Lines connecting the control module 19 and the lower electronic block 20 with each other through the clock tap 13 and the data tap 14 may be called as clock line and data line.

The control signal transmitting tap 15 may be a tap for transmitting a control signal to a lower slave electronic block 20. The control signal transmitting tap 15 may be connected to an output pin GPO of the control module 10 such as the MCU and enable the control module 19 to transmit the control signal to the lower slave electronic block 20 through the output pin GPO. A line connecting the control module 19 and the lower electronic block 20 with each other through the control signal transmitting tap 15 may be called as a control line.

The control signal of the control module 19 may activate the electronic block 20 connected to a lower portion of the control module 19 and control the lower electronic block 20 to transmit one's own instruction (or command) and identification information. After the control signal is transmitted, the control module may be standing-by ready to receive the data from the data line. As such, the control module 19 may receive the instructions (or commands), the identification information and so on from the electronic blocks 20 which are cascaded-connected to a lower portion of one's own.

Also, the control module 19 may perform the data communication with the smart terminal 60 and transmit the instruction (or command) or the identification information of one's own electronic block 10 or the instructions or the identification information, which are received from different slave electronic blocks 20 cascade-connected to the lower portion of one's own electronic block 10, to the smart terminal 60. When a start instruction (or command) or others is received from the smart terminal 60, the control module 19 may start collecting (or receiving) the identification information of one's own electronic block 10 and lower electronic blocks 20 and so on. To this end, the control module 19 may communicate with the power supply and communication module 16 using a part D1 of the input/output pins.

The input module 17 may include an element, such as a buttons, a sensor, a touch pad or others, perceiving (or sensing) an external input. As shown in the previous FIG. 3, the input module 17 may be clickably implemented in an external surface of the master electronic block 10. If a user executes an input by clicking the input module 17, the input module 17 may transmit a detected input value to the control module 19 such as the MCU. At this time, the control module 19 may receive the input value from the input module 17 through another part D2 of the input/output pins.

Continuously, a micro controller unit MCU in accordance with a first embodiment of the present disclosure will be described in detail with reference to FIG. 5. Preferably, the control module of the master electronic block 10 or the slave electronic block 20 may be implemented by the micro controller unit MCU.

As shown in FIG. 5, the micro controller unit MCU may include an arithmetic and logic unit operating and processing the data and a random access memory RAM and a read only memory ROM which are used to store the data. The read only memory may become one of an electrically erasable programmable read-only memory EEPROM, a flash memory and so on, in order to store programs. As such, the micro controller unit MCU may perform desired works in accordance with the programs stored in the read only memory ROM.

Also, the micro controller unit MCU may include an interface portion and input/output pins which are used for a data communication with an external device. As shown in FIG. 5, a plurality of input/output pins P1, P2, . . . , PN may be provided as input/output pins for the communication of the micro controller unit MCU.

The data communication with the external device may be performed in communication modes such as a serial peripheral interface (SPI), a universal synchronous/asynchronous receiver/transmitter (USART), an inter-integrated circuit (I2C) and so on. To this end, input/output pins supporting each of the above-mentioned communication modes or at least two of the above-mentioned communication modes may be provided in the micro controller unit MCU. As such, the data communication with the external device may be performed using the input/output pins of the micro controller unit MCU which support a desired communication mode.

The USART (Universal Synchronous/Asynchronous Receiver/Transmitter) may be a universal synchronous communication mode or a universal asynchronous communication mode which uses a serial communication mode such as a RS232 (Recommended Standard 232) and so on. As such, the micro controller unit MCU can perform a serial data communication with a different slave electronic block 20 in the UART (Universal Asynchronous Receiver/Transmitter) mode or the USRT (Universal Synchronous Receiver/Transmitter) mode. The serial communication using the USART may have an advantage of minimizing the number of communication lines. Particularly, a small amount of data is transmitted from the electronic blocks 10 and 20 in accordance with the present disclosure. Therefore, a propagation delay (or a low propagation speed) does not cause any problem.

The I2C (Inter Integrated Circuit) corresponds to a communication mode using a serial data (SDA) signal, which includes data train, and a serial clock (SCL) signal which includes a clock train. In detail, the I2C transmits the data through a serial data (SDA) line in synchronization with the serial clock (SCL) signal. In other words, the I2C communication mode is a serial communication mode which transmits the data through the serial data (SDA) line. However, the I2C communication mode has a disadvantage of requiring an additional communication line, which is used for the clock signal, one more compared with the USART communication mode.

The control module 19 of the above-mentioned master electronic block 10 may perform the data communication in the I2C communication mode by connecting a part of the input/output pins, which support the I2C communication mode, to the clock tap 13 and the data tap 14. Also, the control module 19 may use an output pin GPO, which performs a general purpose communication, as a control signal transmitting pin by connecting the output pin GPO to the control signal transmitting tap 15. Moreover, the control module 19 may communicate with the power supply and communication module 16 using a part D1 of the input/output pins. Furthermore, the control module 19 may receive the input value from the input module 17 using another part D2 of the input/output pins.

Meanwhile, the micro controller unit MCU may include a high voltage pin Vcc for receiving the supply voltage (i.e., a high supply voltage Vcc) and a reset pin RST for initializing a function of the micro controller unit MCU. When the supply voltage (i.e., the high supply voltage Vcc) is applied to the high voltage pin Vcc, a reset signal may be simultaneously developed at the reset pin RST and enable the micro controller unit MCU to be entirely initialized. Also, when an input is applied to the high voltage pin Vcc or the reset pin RST, the micro controller unit MCU may be initialized and execute the program, which is stored in the ROM, from the beginning.

The configuration of the slave electronic block 20 in accordance with a 1-1st embodiment of the present disclosure will now be described in detail with reference to FIGS. 6 and 7. FIG. 6 is a perspective view showing an external shape structure of the slave electronic block 20. FIG. 7 is a circuitry diagram showing an internal configuration of the slave electronic block 20.

Referring to FIG. 6, the slave electronic block 20 in accordance with an embodiment of the present disclosure may include a body 20a and first and second combination portions 20b and 20c disposed upper and lower surfaces of the body 20a. An instruction (or command) phrase consisting of a character string is displayed on a surface of the body 20a, in order to easily recognize the function or instruction (or command) of the slave electronic block 20. The instruction (or command) phrase of the character string may be represented with one of English alphabet, Korean alphabet and so on.

Each of the first and second combination portions 20b and 20c can be used as a combination means capable of being combined with a different electronic block, i.e., the master electronic block 10 or another slave electronic block 20. For example, the first combination portion 20b disposed on the upper surface of the body 20a can be formed a combination groove (or concave) shape and the second combination portion 20c disposed on the lower surface of the body 20a can be formed in a protrusion shape. In this case, the first combination portion 20b with the combination groove shape can be combined with either the second combination portion 20c of a different slave electronic block 20 having the protrusion shape or the combination portion 10b of the mater electronic block 10 having the protrusion shape. Moreover, each of the first and second combination portions 20b and 20c can include a plurality of sub combination portions which are formed in several regions of the upper or lower surface of the body 20a. In other words, each of the first and second combination portions 20b and 20c can include a plurality of protrusions or combination grooves (or concaves).

As shown in FIG. 7, the slave electronic block 20 in accordance with an embodiment of the present disclosure may include: first and second high voltage taps 21a and 21b connected to a high voltage source Vcc; first and second low voltage taps 22a and 22b connected to a low voltage source Gnd; first and second clock taps 23a and 23b and first and second data taps 24a and 24b which are for receiving data. Also, the slave electronic block 20 may include: control signal receiving and transmitting taps 25a and 25b for receiving and transmitting a control signal from a combined different-electronic block: and a control module 29 including a micro controller unit MCU.

The first high voltage tap 21a, the first low voltage tap 22a, the first clock tap 23a, the first data tap 24a and the control signal receiving tap 25a are disposed on the surface (i.e., bottom) of the first combination portion 20b which is formed on the upper surface of the respective electronic block 20. The second high voltage tap 21b, the second low voltage tap 22b, the second clock tap 23b, the second transmitting tap 24b and the control signal transmitting tap 25b are disposed on the surface (i.e., lower surface) of the second combination portion 20c which is formed on the lower surface of the respective electronic block 20. If each of the first and second combination portions 20a and 20b includes the plurality of sub combination portions, the first high voltage tap 21a, the first low voltage tap 22a, the first clock tap 23a, the first data tap 24a and the control signal receiving 25a can be dispersedly disposed in the plurality of sub combination portions within the first combination portion 20b. Similarly, the second high voltage tap 21b, the second low voltage tap 22b, the second clock tap 23b, the second data tap 24b and the control signal transmitting tap 25b can be dispersedly disposed in the plurality of sub combination portions within the second combination portion 20c.

If the first or second combination portion 20b or 20c is combined with the master electronic block 10 or a different slave electronic block 20, the taps of the first or second combination portion 20b or 20c come in contact with opposite taps of the master electronic block 10 or the different slave electronic block 20. As such, the first or second combination portion 20b or 20c can be electrically connected with the master electronic block 10 and the different slave electronic block 20.

The first and second high voltage taps 21a and 21b and the first and second low voltage taps 22a and 22b are used as voltage taps for transferring a supply voltage. In detail, the first and second high voltage taps 21a and 21b and the first and second low voltage taps 22a and 22b are connected to a high voltage line 21c and a low voltage line 22c and transfers the supply voltage from a different electronic block (i.e., master electronic block 10 or one different slave electronic block 20), which is combined with the upper portion of one's own electronic block, toward another different electronic block (one or another different slave electronic block 20) which is combined with one's own electronic block. In detail, the high voltage line 21$c$ and the low voltage line 22$c$ are connected to the first high voltage tap 21$a$ and the first low voltage tap 22$a$, in order to receive the supply voltage from the different electronic block (i.e., the master electronic block 10 or one different slave electronic block 20). Such high and low voltage lines 21$c$ and 22$c$ apply the received supply voltage to the control module 29. Also, the high voltage line 21$c$ and the low voltage line 22$c$ are connected to the second high voltage tap 21$b$ and the second low voltage tap 22$b$ and apply the received supply voltage to another different electronic block (i.e., one or another different slave electronic block 20). Therefore, the plurality of electronic blocks 10 and 20 cascade-connected with one another can receive the supply voltage in a parallel connection mode through one's own high voltage line 21$c$ and low voltage line 22$c$.

The first and second clock taps 23$a$ and 23$b$ and the first and second data taps 24$a$ and 24$b$ may be used for a data communication and more particularly a serial communication. Such clock and data taps 23$a$, 23$b$, 24$a$ and 24$b$ are connected to a clock line 23$c$ and a data line 24$c$ and form a data communication path between different electronic blocks 10 and 20 which are connected to the upper and lower portions of one's own slave electronic block 20. Preferably, the communication taps 23$a$, 23$b$, 24$a$ and 23$b$ may be terminals for a serial communication of the I2C (Inter Integrated Circuit) mode. As such, the communication taps 23$a$, 23$b$, 24$a$ and 24$b$ may be used to transmit and receive a serial clock (SCL) signal and a serial data (SDA) signal. In this case, the data is transmitted through a serial data (SDA) line in synchronization with the serial clock (SCL) signal. Consequently, the clock line 23$c$ and the data line 24$c$ may form a serial clock (SCL) path and a serial data (SDA) path for the serial communication of the I2C mode. In detail, the clock line 23$c$ and the data line 24$c$ are connected to the first clock tap 23$a$ and the first data tap 24$a$ and form the data communication path with one different electronic block (i.e., the master electronic block 10 or one different slave electronic block 20) which is combined with the upper portion of one' own slave electronic block 20. Also, the clock line 23$c$ and the data line 24$c$ are connected to the second clock tap 23$b$ and the second data tap 24$b$ and form the data communication path with another different electronic block (i.e., one different slave electronic block 20 or another different slave electronic block 20) which is combined with the lower portion of one' own slave electronic block 20. Therefore, when the plurality of electronic blocks 10 and 20 are cascade-connected with one another, a data communication path is formed by the clock and data lines 23$c$ and 24$c$. As such, the control module 29, such as the MCU and so on, may be connected to the clock line 23$c$ and the data line 24$c$ and transmit data through the data communication path.

FIG. 8 shows the configuration of the high and low voltage lines 21$c$ and 22$c$ and the clock and data lines 23$c$ and 24$c$ when the plurality of electronic blocks are cascade-combined with one another. As shown in Figure, the data communication path may connect the master electronic block 10 with the slave electronic blocks 20. As such, each of the slave electronic blocks 20 may perform the serial data communication with the mater electronic block 10. Accordingly, the data may be transferred from each of the slave electronic blocks 20 to the master electronic block 10.

The control signal receiving tap 25$a$ is used to receive the control signal from an upper slave electronic block 20 which is combined with one's own slave electronic block 20. Preferably, the control module 29 may receive the control signal of an activation value through the control signal receiving tap 25$a$. Also, the control signal transmitting tap 25$b$ is used to transmit the control signal to a different electronic block 20 which is combined with a lower portion of one's own electronic block 20.

The control module 29 of the slave electronic block 20 may perform the data communication in the I2C communication mode by connecting input/output pins SCL and SDA, which support the I2C communication mode, to the clock line 23$c$ and the data line 24$c$. Also, the control module 29 may connect different input/output pins GPI and GPO, which support a general purpose communication, to the control signal receiving tap 25$a$ and the control signal transmitting tap 25$b$, in order to use the input/output pins GPI and GPO as communication pins for receiving or transmitting the control signal.

As seen from an example shown in FIG. 8, all the master electronic block 10 and the slave electronic blocks #1, #2, . . . # n−1 can transmit the control signal to the electronic blocks #1, #2, . . . , # n which are connected with their lower portions. Each the slave electronic blocks may transmit one's own instruction (or command) and identification information through the data communication path when the control signal is received from the upper electronic block. Then, each the slave electronic blocks may transmit the control signal to the lower electronic block. In this manner, the slave electronic blocks #1, #2, . . . , # n may sequentially transmit their own data (i.e., the instruction and the identification information) to the master electronic block.

The control module 29 may include the micro controller unit MCU, which is shown in FIG. 5, and so on. Such a control module 29 may receive the control signal and perform a data communication through the data communication path 23$c$ and 24$c$. Also, the control module 29 may transmit an instruction and identification information and so on for one's own electronic block 20.

The micro controller unit MCU of the control module 29 may connect the input/output pins, which support the I2C communication mode, to the clock line 23$c$ and the data line 24$c$ and perform the data communication in the I2C communication mode. In other words, the micro controller unit MCU of the control module 29 may transmit the data to the master electronic block 10 through the serial data communication path which is formed by the clock line 23$c$ and the data line 24$c$ and connected with the master electronic block 10.

Also, the micro controller unit MCU of the control module 29 may connect an output pin GPO, which supports the general purpose communication, to the control signal transmitting tap 25$b$ and use the output pin GPO as a communication pin for transmitting the control signal. Moreover, the control module 29 may connect an input pin GPI, which supports the general purpose communication, to the control signal receiving tap 25$a$ and use the input pin GPI as another communication pin for receiving the control signal.

Furthermore, the micro controller unit MCU of the control module 20 may receive the supply voltage. To this end, the high voltage pin Vcc and the low voltage pin Gnd for receiving the supply voltage may be connected to the high voltage line 21$c$ and the low voltage line 22$c$.

Subsequently, an operation procedure of the slave electronic block 20 in accordance with the first embodiment of the present disclosure will be described in detail with reference to FIG. 9.

As shown in FIG. 9, when the supply voltage is applied (S11), the control module 29 of the slave electronic block 20 may enter into a stand-by mode that it is waiting to receive the control signal (S12).

If the control module 29 receives the control signal, the slave electronic block 20 may be triggered (or activated) and transmit the data (S13). In detail, the control module 29 may transmit one's own identification data through the serial data communication path which is formed by the clock line 23c and the data line 24c. At this time, the control module 29 may directly transmit the data to the micro controller unit MCU of the master electronic block 10 through the serial data communication path connected with the master electronic block 10. When the data transmission is completed, the control module 29 may terminate the data communication (a disable process).

The identification data may include one's own instruction phrase and/or identification code, an option value of an option electronic block, which will be described later, and so on.

Also, when the data transmission is completed, the control module 29 may transmit the control signal to a lower electronic block 20 which is connected with one's own electronic block 20 (S14).

Preferably, after the control signal is transmitted to the lower electronic block 20, the control module 29 may re-enter into the control signal stand-by mode (S16). In accordance therewith, the identification data of the electronic blocks can be re-transmitted from the beginning when the master electronic block 10 re-transmits the control signal.

Continuously, an operation procedure of the master electronic block 10 in accordance with the first embodiment of the present disclosure will be described in detail with reference to FIG. 10.

As shown in FIG. 10, if the master electronic block 10 is powered-on (S21), the master electronic block 10 may stand-by until a start command is received from the smart terminal 60 (S22). The start command may enable the master electronic block 10 to collect information about the plurality of slave electronic blocks 20 and transmit the collected information. The information about the slave electronic blocks may include identification information of the electronic blocks, such as identification code and so on, a connection sequence of the electronic blocks and so on.

When the start command is received, the master electronic block 10 or the control module 19 may transmit the control signal to the lower slave electronic block 20 (S23). The lower slave electronic block 20 may be an electronic block directly connected to the master electronic block 10.

The master electronic block 10 may receive the data which is transmitted from the slave electronic block 20. Preferably, the master electronic block 10 or the control module 19 may receive the data through the clock tap 13 and the data tap 14 which are connected to the data communication path 23c and 24c. More preferably, the master electronic block 10 or the control module 19 may receive the data by performing the serial communication of the I2C communication mode.

Then, the master electronic block 10 may check whether or not the data is continuously received (S24). If the data is continuously received, the master electronic block 10 may continuously or repeatedly receive the data of the slave electronic block 20 (S25). As described above, the plurality of slave electronic blocks 20 are cascade-connected to the master electronic block 10 and so the slave electronic blocks 20 can sequentially transmit their own data to the master electronic block 10 in their connection sequence. In other words, a first slave electronic block 20 directly connected to the master electronic block 10 can first transmit one's own data to the master electronic block 10, and then a second slave electronic block 20 can second transmit one's own data to the master electronic block 10.

In accordance therewith, the master electronic block 10 must continuously or repeatedly receive the data of the electronic blocks until the data from all the cascade-connected electronic blocks is received.

Preferably, the master electronic block 10 may try to receive the data a desired number of times. Nevertheless, if the data is not received, the master electronic block 10 may determine that any data to receive is not remained. It is preferable for the receiving try to perform two or three times. In another way, after the data communication is completed, it may be checked whether or not additional data is received within a desired time interval. In this case, when any data is not received, it may be determined that any data to receive is not remained.

Thereafter, if any data to receive is not remained, the master electronic block 10 may transmit the entire data, which is received from the slave electronic blocks 20, to the smart terminal 60 (S26).

The data transmitted to the smart terminal 60 may include the number of entire blocks (or nodes) or the number of slave electronic blocks, a sequence of the blocks, identification data of each block and so on. The number of nodes or blocks meaning to the total number of slave electronic blocks may represent the number of received data (or received data packets). Also, the sequence of nodes or blocks may indicate a receiving sequence of the data (or the data packets).

A procedure of extracting an entire flow chart of the combined electronic blocks by the smart terminal 60 or the program execution tool 70 in accordance with a first embodiment of the present disclosure will now be described in detail with reference to previous FIGS. 8 through 10.

If the smart terminal 60 or the program execution tool 70 transmits the start command to the master electronic block 10, the master electronic block 10 may transmit the control signal to its lower slave electronic block #1. As such, the slave electronic block #1 may be activated and transmit the data in the serial communication mode through the serial clock and data pins SCL and SDA and the serial data communication path connected to the master electronic block 10. In this time, the slave electronic block #1 may transmit one's own identification data (or an unique identifier). In addition, the slave electronic block #1 may transmit the option value (is provided by the option block) and so on.

Afterward, the slave electronic block #1 may transmit the control signal to its own lower slave electronic block #2 and enable the slave electronic block #2 to be activated. In this manner, the first slave electronic block #1 to the last slave electronic block # N may be sequentially activated. As such, the first slave electronic block #1 to the last slave electronic block # N may sequentially transmit the data.

Meanwhile, when any data is not received through the serial data communication path, the master electronic block may determine that the data (or the data packet) received last is transmitted from the last slave electronic block # N. As this time, the master electronic block may terminate the data receiving process.

Thereafter, the master electronic block may transmit the received data (or the received data packets) and their number and sequence to the smart terminal 60 or the program execution tool 70.

Subsequently, the configuration of the slave electronic block 20 in accordance with a 1-2nd embodiment of the present disclosure will now be described in detail with reference to FIGS. 11 through 13. FIG. 11 is a perspective view showing an external shape structure of the slave electronic block 20. FIG. 12 is a circuitry diagram showing an internal configuration of the slave electronic block 20. FIG. 13 is a perspective view illustrating a process of inserting an optional electronic block 30 into a slave electronic block 20.

As shown in FIG. 11, the slave electronic block 20 of the second embodiment of the present disclosure has the same configuration as that of the first embodiment, except that a combination hole (or depression) 20*d* receiving an optional electronic block 30 is formed.

Also, the slave electronic block 20 may further include an option input portion 26 electrically contacting the optional electronic block 30, as shown in FIG. 12. The option input portion 26 may include a third high voltage tap 26*a*, a third low voltage tap 26*b* and an option output tap 26*c*. The third high and low voltage taps 26*a* and 26*b* and the option output tap 26*c* may be disposed on inner side surfaces of the combination hole (or depression) 20*d*.

The third high voltage tap 26*a* and the third low voltage tap 26*b* are used to apply the supply voltage to the optional electronic block 30. The option output tap 26*c* is used to transfer (or output) an option value of the optional electronic block 30. As such, the optional electronic block 30 outputs the option value through the option output tap 26*c* and transmits the option value to the control module 29.

The control module 29 receives a signal transferred from the option output tap 26*c* and obtains the option value from the received signal. The signal on the option output tap 26*c* is an analog signal which has intensity of current or voltage varying along the option value. As such, the control module 29 can obtain the option value of the optional electronic block 30 by converting the intensity of current or voltage into a digital signal The optional electronic block 30 in accordance with a 1-2nd embodiment of the present disclosure will now be described in detail with reference to FIGS. 14 through 16.

Referring to FIG. 14, the optional electronic block 30 may be formed in a tetragonal box shape. Such an optional electronic block 30 may be inserted into the combination hole (or depression) 20*d* of the slave electronic block 20 of the above-mentioned second embodiment. In the previous example shown in FIG. 13, the slave electronic block 20 represents an instruction of 'move 10 steps'. As such, the optional electronic block 30 may represent an option value of '10'.

As shown in FIG. 14, the option value may be displayed on a surface of the optional electronic block 30 as a symbol which includes at least one of numeral, character, sign and so on. Moreover, a pattern, such as sensor kind, color or others, can be displayed on the surface of the optional electronic block 30 as the option value. FIG. 15 is an internal circuitry diagram showing an internal configuration of the optional electronic block 30 on which the optical value is displayed. FIG. 16 is a circuitry diagram showing an internal configuration of the optional electronic block 30 and the slave electronic block 20 which are combined with each other.

Such an option value can be differently set using a resistor divider R1 and R2, as shown in FIGS. 15 and 16. As such, the optional electronic block 30 can represent distinguishably a variety of symbols from one another.

In the example of FIG. 13, the control module (or MCU (Micro Controller Unit)) 20 may perceive the option value of '10' on the basis of a resistance division rate of the resistor divider R1 and R2 of the optional electronic block 30 input through one's own single port, in order to recognize the instruction of 'move 10 steps'. If an ADC (Analog-to-Digital Converter) of the control module (or MCU) 29 has 8 bits, maximal 256 kinds of optional electronic blocks (30) can be distinguished from one another by the option value. In other words, the option values of the option electronic blocks 30 can be differently designated maximal 256 by varying the resistance division rate of the resistor divider R1 and R2.

Referring to FIG. 16, the resistor divider R1 and R2 of the optional electronic block 30 divides the supply voltage $V_{DD}$ and applies a divided voltage $V_{ADC}$ to an ADC port (or pin) of the control module 29 of the slave electronic block 20. As such, the control module 29 can read the option value of the optical electronic block 30 on the basis of the divided voltage $V_{ADC}$ received through the ADC port. The divided voltage (or current value) $V_{ADC}$ applied to the ADC port is determined by the following equation 1.

$$V_{ADC} = \frac{R_2}{R_1 + R_2} \times V_{DD} \qquad \text{[Equation 1]}$$

The optional electronic block 30 representing a variety of symbols can designate a variety of patterns including the kind of specified sensor, the kind of object, the kind of color and so on. In this case, different option values distinguishing the specified sensors, the objects, colors and so on can be set. In accordance therewith, the control module 29 can distinguish the kinds of sensor, object and color on the basis of the option value of the optional electronic block 30.

In other words, the optional electronic block 30 outputs the divided voltage value of the resistor divider R1 and R2. As such, the control module 29 can convert the divided voltage value, which is output from the resistor divider R1 and R2 of the optional electronic block 30, into a digital valve in order to obtain the option value of the optional electronic block 30.

Next, a method of extracting an entire flow chart of combined electronic blocks by the smart terminal 60 or the program execution tool in accordance with a first embodiment of the present disclosure will be described in detail.

In the method of extracting the entire flow chart of the combined electronic blocks, a last nth electronic block can be firstly found by a GPIO (General Purpose Input/Output). The found nth electronic block is activated and transmits data toward the Rx tap 14*b* of the master electronic block 10 through one's own Tx tap 23*a* in the serial communication mode.

Thereafter, a (n−1)th electronic block is activated and transmits the data and then (n−2)th electronic block is activated and transmits the data. In this manner, the electronic blocks from nth up to first can sequentially transmit the data. As such, the last master electronic block 10 can store unique identification codes and option values of the lower electronic blocks.

If either at least one electronic block is added or the sequence of the electronic blocks is changed, the nth electronic block is activated again.

A method of finding the last nth electronic block using the GPIO and a serial data transmission mode between UART (Universal Asynchronous Receiver/Transmitter) Tx and Rx pins of the MCUs will now be described.

The method of finding the last nth electronic block using the GPIO will be firstly described. If any electronic block is not connected to the nth electronic block after n electronic blocks are sequentially connected to the master electronic block 10. In this case, the combination signal input to the GPIO of the nth electronic block becomes a default value (i.e., an off state) of 'L(low)'. In accordance therewith, the nth electronic block can be found as the last electronic block. Therefore, the n electronic blocks can transmit identification codes, instructions and option values about their own blocks to the master electronic block 10 in an inverse sequence from nth electronic block up to first electronic block.

Continuously, the serial data transmission mode between the UART Tx and Rx pins of the MCUs will be described in detail.

When the last nth electronic block is found using the above-mentioned GPIO, the unique identification code, instruction and option value of the nth electronic block are transmitted from the UART Tx of the MCU of the nth electronic block the UART Rx pin of the MCU of the master electronic block. Thereafter, the nth electronic block transitions the combination signal, which is applied to the GPIO of the (n–1)th electronic block, from an activation value (or on state) of 'H(high)' to the default value of 'L(low)' in order to start the data transmission of the (n–1)th electronic block. As such, the (n–1)th electronic block transmits the data and then transitions the combination signal, which is applied to the GPIO of the (n–2)th electronic block, from an activation value (or on state) of 'H(high)' to the default value of 'L(low)'. In accordance therewith, the (n–2)th electronic block can transmit the data. In this manner, the first electronic block can transmit the data in the last sequence.

The configurations of a master electronic block 10, a slave electronic block 20 and an entire electronic block train thereby in accordance with a second embodiment of the present disclosure will now be described in detail with reference to FIGS. 17 through 19.

Referring to FIG. 17, the master electronic block 10 in accordance with a second embodiment of the present disclosure may include a high voltage tap 111 and a low voltage tap 112 each connected to a high voltage source Vcc and a low voltage source Gnd, a Rx (receiving) tap 114 for receiving data, a control signal transmitting tap 115 for transmitting a control signal to a combined different electronic block, a power supply and communication module 116 connected to the communication unit 50, and a control module 119 including a micro controller unit MCU. Also, the master electronic block 10 may include an input module 117 perceiving input signals through input elements such as buttons, sensors and so on.

Unlike the previous first embodiment, the second embodiment of the present disclosure may perform a serial data communication in the UART (Universal Asynchronous Receiver/Transmitter) mode in order to transfer the data. In detail, the first embodiment must use two lines, such as the clock line and the data line, in order to receive the data. However, the second embodiment can receive the data using only a single line such as the Rx line.

In other words, the master electronic block 10 include only the Rx tap 114 in order to receive the data. The Rx tap 114, the high voltage tap 111, the low voltage tap 112, the control signal transmitting tap 115 may be disposed in a combination portion which is formed a low surface of the master electronic block 10. As such, when the combination portion 10 is combined with a slave electronic block 20, the Rx tap 114, the high voltage tap 111, the low voltage tap 112 and the control signal transmitting tap 115 may be connected to respective taps of the slave electronic block 20.

The high voltage tap 111, the low voltage tap 112, the control signal transmitting tap 115, the power supply and communication module 116 and the input module 117 has the same configuration as those of the first embodiment. As such, the detailed description of the high voltage tap 111, the low voltage tap 112, the control signal transmitting tap 115, the power supply and communication module 116 and the input module 117 will be omitted in order to avoid overlapping with the first embodiment.

The Rx tap 114 may be used as a tap for a data communication, particularly a serial data communication. The Rx tap 14 may connect a data line to a lower slave electronic block 20 which is combined with one's own master electronic block 10. Also, the Rx tap 114 may be connected an input/output pin Rx of the control module 119 such as the micro controller unit MCU and so on. As such, the control module 119, such as the micro controller unit MCU and so on, may perform the serial data communication with the lower slave electronic block 20 and receive the data through the input/output pin Rx. A line connected with the control module 119 and the lower slave electronic block 10 by the Rx tap 114 will be called as a data communication line (or a serial data communication line).

The control signal transmitting tap 115 may be used to transmit the control signal to the lower slave electronic block 20. Such a control signal transmitting tap 115 may be connected to an output pin GPO of the control module 119 such as the micro controller unit MCU and so on. As such, the control module 119 may transmit the control signal to the lower slave electronic block 20 through the output pin GPO.

The control signal output from the control module 119 may control the lower slave electronic block 20 to be activated and transmit one's own instruction or identification information. After the transmission of the control signal, the control module 119 may stand-by receiving the data from the data communication line connected with the Rx tap 114 and receive the instruction or the identification information of the lower slave electronic block 20.

As shown in FIG. 18, the slave electronic block 20 in accordance with the second embodiment of the present disclosure may include first and second high voltage taps 121a and 121b used to transfer a high voltage Vcc, first and second low voltage taps 122a and 122b used to transfer a low voltage Gnd, and first and second Tx (transmitting) taps 124a and 124b used to transfer the data. Also, the slave electronic block 20 may include a control signal receiving tap 125a and a control signal transmitting tap 125b used to receive or transmit the control signal from or to a combined different electronic block, and a control module 129 including a micro controller unit MCU.

Unlike the previous first embodiment, the second embodiment of the present disclosure may perform a serial data communication in the UART (Universal Asynchronous Receiver/Transmitter) mode in order to transfer the data. In detail, the first embodiment must use two lines, such as the clock line and the data line, in order to transmit the data. However, the second embodiment can transmit the data using only a single line such as the Tx line.

In other words, the slave electronic block 20 in accordance with the second embodiment of the present disclosure can require only the first and second Tx taps 124a and 124b to transfer the data.

The first and second Tx taps 124a and 124b may be used for the data communication, particularly the serial data communication. Such first and second Tx taps 124a and 124b may be connected with each other through a data line 124c and form the data communication line which connects different electronic blocks 10 and 20 combined with one's own slave electronic block 20. Preferably, the communication taps 124a and 124b can be used for the serial data communication of the USAT communication mode and transfer a Tx signal. As such, the data line 124c can be connected to the Rx tap 114 of the master electronic block 10 and form a Tx-Rx line for the serial data communication of the USAT communication mode.

In detail, the data line 124c may be connected to the first Tx tap 124a and form the data communication line connected with an upper electronic block 10 or 20 which is combined with one's own electronic block 20. Also, the data line 124c may be connected to the second Tx tap 124b and form the data communication line connected with the lower electronic block 20 which is combined with one's own electronic block 20. As such, when a plurality of electronic blocks 10 and 20 may be cascade-combined with one another, a serial data communication line may be formed by the data lines 124c of the electronic blocks 20. Also, the control module 129, such as the micro controller unit MCU and so on, may be connected to the data line 124c and transmit the data through the Tx-Rx line (or the serial data communication line).

When the above-mentioned plural electronic blocks 10 and 20 are cascade-combined with one another, the connection configuration of the data lines 124c may become as shown in FIG. 19. As seen from FIG. 19, the data communication line formed by the data lines 124c is connected to the master electronic block 10. As such, each the slave electronic blocks 20 can perform the serial data communication with the master electronic block 10. Therefore, the data can be transferred from each the slave electronic blocks 20 to the master electronic block 10.

The control module 129 of the slave electronic block 20 may connect an input/output pin Tx, which supports the UART mode, to the data line 124c and perform the data communication of the UART communication mode using the Tx-Rx line (or the serial data communication line). Also, the control module 129 may connect input/output pins GPI and GPO, which support the general purpose communication, to the control signal receiving and transmitting taps 125a and 125b and use as communication taps for receiving and transmitting the control signal.

The control signal receiving tap 125a may receive the control signal from another slave electronic block 20 (or the master electronic block 10) which is combined with an upper portion of one's own slave electronic block 20. Preferably, the control module 129 may receive the control signal of "ON" through the control signal receiving tap 125a. Also, the control signal transmitting tap 125b may transmit the control signal to still another slave electronic block 20 which is combined with a lower portion of one's own slave electronic block 20.

As seen from an example shown in FIG. 19, all the master electronic block 10 and the slave electronic blocks #1, #2, . . . # n−1 can transmit the control signal to the electronic blocks #1, #2, . . . , # n which are connected with their lower portions. Each the slave electronic blocks may transmit one's own instruction (or command) and identification information through the Tx-Rx line (or the data communication line) when the control signal is received from the upper electronic block. Then, each the slave electronic blocks may transmit the control signal to the lower electronic block. In this manner, the slave electronic blocks #1, #2, . . . , # n may sequentially transmit their own data (i.e., the instruction and the identification information) to the master electronic block.

Continuously, the configurations of a master electronic block 10, a slave electronic block 20 and an entire electronic block train thereby in accordance with a third embodiment of the present disclosure will be described in detail with reference to FIGS. 20 through 22.

As shown in FIG. 20, the master electronic block 10 in accordance with the third embodiment of the present disclosure may include a high voltage tap 211 and a low voltage tap 212 each connected to a high voltage source Vcc and a low voltage source Gnd, a Rx (receiving) tap 214 for receiving data, a control signal transmitting tap 215 for transmitting a control signal to a combined different electronic block, a power supply and communication module 216 connected to the communication unit 50, and a control module 119 including a micro controller unit MCU. Also, the master electronic block 10 may include an input module 217 perceiving input signals through input elements such as buttons, sensors and so on.

The master electronic block 10 in accordance with the third embodiment of the present disclosure has the same configuration as that of the second embodiment, except that the control signal transmitting tap 215 is connected to a reset tap 225a of a lower slave electronic block 20. In detail, the second embodiment forces the slave electronic block 20 to receive the control signal using the general purpose input pin GPI. However, the slave electronic block 20 of the third embodiment does not use the general purpose input pin GPI in order to receive the control signal.

Referring to FIG. 21, the slave electronic block 20 in accordance with the third embodiment may include first and second high voltage taps 221a and 221b used to transfer the high voltage Vcc, first and second low voltage taps 222a and 222b used to transfer the low voltage Gnd, first and second Tx (transmitting) taps 224a and 224b used to transfer the data, a reset tap 225a used to receive the control signal from a different electronic block combined with its electronic block, a control signal transmitting tap 225b used to transmit the control signal to another different electronic block combined with its electronic block, and a control module 229 including a micro controller unit MCU.

The slave electronic block 20 in accordance with the third embodiment of the present disclosure has the same configuration as that of the above-mentioned second embodiment, except that the control signal receiving tap of the slave electronic block 20 is replaced with the reset tap 225a. In other words, the slave electronic block 20 of the second embodiment receives the control signal using a general purpose input pin GPI, but the slave electronic block 20 of the third embodiment receives the control signal using a reset pin RST. As such, the slave electronic block 20 of the third embodiment can include the reset tap 225a used to receive the control signal. On the other hand, the detailed description of the other components of the slave electronic block 20 in accordance with the third embodiment will be omitted in order to avoid overlapping with the second embodiment.

The control module 229 of the slave electronic module 20 may connect an output pin Tx, which supports the UART communication mode, with a data line 224c and perform the data communication of the UART communication mode using a Tx-Rx line (or a serial data communication line). Also, the control module 229 may connect another output pin GPO, which supports the general purpose communication, with the control signal transmitting tap 225b and use as a communication pin for transmitting the control signal. Moreover, the control module 229 may connect the reset pin RST, which is used to reset the micro controller unit MCU, with the reset tap 225a and use as a control pin for receiving the control signal and resetting the micro controller unit MCU.

The control signal transferred from an upper slave electronic block 20 to the reset tap 225a may turn-on (or activate) the reset pin RST of the control module 229 such as the micro controller unit MCU and so on. In accordance therewith, the control module 229 may be reset (or initialized) and then transmit one's own identification information and so on. Thereafter, the control module 229 may perform a process of transmitting the control signal to a lower slave electronic block 20.

Similarly to the previously described micro controller unit MCU of FIG. 5, the program stored in the read only memory ROM can be executed from the beginning when the micro controller unit MCU or the control module 229 is initialized by the reset pin RST. The program stored in the read only memory ROM can be previously written to execute processes of transmitting one's own identification information and so on and sending the control signal to the lower slave electronic block 20. In other words, if the control module 229 is reset, the program stored in the read only memory ROM is executed and enables the above-mentioned processes to be performed.

As seen from an example shown in FIG. 22, all the master electronic block 10 and the slave electronic blocks #1, #2, . . . # n−1 can transmit the control signal to the electronic blocks #1, #2, . . . , # n which are connected with their lower portions, in order to reset the lower electronic blocks #1, #2, . . . , # n. Each the slave electronic blocks may be reset or initialized by the upper electronic block and then transmit one's own instruction (or command) and identification information through the Tx-Rx line (or the data communication line). Thereafter, each the slave electronic blocks may transmit the control signal to the lower electronic block. In this manner, the slave electronic blocks #1, #2, . . . , # n may sequentially transmit their own data (i.e., the instruction and the identification information) to the master electronic block 10.

Subsequently, the configurations of a master electronic block 10, a slave electronic block 20 and an entire electronic block train thereby in accordance with a fourth embodiment of the present disclosure will be described in detail with reference to FIGS. 23 through 25.

As shown in FIG. 23, the master electronic block 10 in accordance with the fourth embodiment of the present disclosure may include a high voltage tap 311 and a low voltage tap 312 each connected to a high voltage source Vcc and a low voltage source Gnd, a Rx (receiving) tap 314 for receiving data, a control signal transmitting tap 315 for transmitting a control signal to a combined different electronic block, a power supply and communication module 316 connected to the communication unit 50, and a control module 319 including a micro controller unit MCU. Also, the master electronic block 10 may include an input module 317 perceiving input signals through input elements such as buttons, sensors and so on.

The master electronic block 10 in accordance with the fourth embodiment of the present disclosure has the same configuration as that of the third embodiment, except that the control signal transmitting tap 315 is connected to a power switch control tap 325a of a lower slave electronic block 20. In other words, the fourth embodiment can simultaneously control power-on and reset operations of the slave electronic block 20 using a power switch SW of the slave electronic block 20.

Referring to FIG. 24, the slave electronic block 20 in accordance with the fourth embodiment may include first and second high voltage taps 321a and 321b used to transfer the high voltage Vcc, first and second low voltage taps 322a and 322b used to transfer the low voltage Gnd, first and second Tx (transmitting) taps 324a and 324b used to transfer the data, the power switch control tap 325a used to receive the control signal from a different electronic block combined with its electronic block, a control signal transmitting tap 325b used to transmit the control signal to another different electronic block combined with its electronic block, and a control module 329 including a micro controller unit MCU.

The slave electronic block 20 in accordance with the fourth embodiment of the present disclosure has the same configuration as that of the above-mentioned third embodiment, except that the reset tap of the slave electronic block 20 is replaced with the power switch control tap 325a. In other words, the slave electronic block 20 of the fourth embodiment may further include a power switch SW. The power switch SW may be turned-on or turned-off by the control signal received through the power switch control tap 325a. On the other hand, the detailed description of the other components of the slave electronic block 20 in accordance with the fourth embodiment will be omitted in order to avoid overlapping with the third embodiment.

The control module 329 of the slave electronic module 20 may connect an output pin Tx, which supports the UART communication mode, with a data line 324c and perform the data communication of the UART communication mode using a Tx-Rx line (or a serial data communication line). Also, the control module 329 may connect another output pin GPO, which supports the general purpose communication, with the control signal transmitting tap 325b and use as a communication pin for transmitting the control signal. Moreover, the power switch SW is connected to a high voltage tap VCC of the control module 329 (i.e., the micro controller unit MCU). As such, the supply voltage may be applied or intercepted by the power switch SW.

If the control signal is transferred from an upper slave electronic block 20 to the power switch control tap 325a, the power switch SW connected to the control module 329, such as the micro controller unit MCU, may be turned-on (or activate). As such, the control module 329 may start inputting the supply voltage and be simultaneously reset (or initialized). After the initialization, the control module 329 may perform processes of transmitting one's own identification information and so on and then sending the control signal to the lower slave electronic block 20.

Similarly to the previously described micro controller unit MCU, the micro controller unit MCU or the control module 320 may be initialized when the supply voltage is applied to the high voltage pin VCC. Then, the program stored in the read only memory ROM can be executed from the beginning. The program stored in the read only memory ROM can be previously written to execute processes of transmitting one's own identification information and so on and sending the control signal to the lower slave electronic block 20. In other words, if the power switch SW connected the control module 329 is turned-on, the program stored in the read only memory ROM is executed. In accordance therewith, the processes of transmitting the data and sending the control signal can be performed.

As seen from an example shown in FIG. 25, all the master electronic block 10 and the slave electronic blocks #1, #2, . . . , # n−1 can transmit the control signal to the electronic blocks #1, #2, . . . , # n, which are connected with their lower portions, and turn-on the power switch SW. Each the slave electronic blocks may be initialized when the power switch SW is turned-on by the upper electronic block. Then, each the slave electronic blocks may transmit one's own instruction (or command) and identification information through the Tx-Rx line (or the data communication line). Thereafter, each the slave electronic blocks may transmit the control signal to the lower electronic block. In this manner, the slave electronic blocks #1, #2, . . . , # n may sequentially transmit their own data (i.e., the identification information and so on) to the master electronic block 10.

Next, the configurations of a master electronic block 10, a slave electronic block 20 and an entire electronic block train thereby in accordance with a fifth embodiment of the present disclosure will be described in detail with reference to FIGS. 26 through 28.

As shown in FIG. 26, the master electronic block 10 in accordance with the fifth embodiment of the present disclosure may include a high voltage tap 411 and a low voltage tap 412 each connected to a high voltage source Vcc and a low voltage source Gnd, a Rx (receiving) tap 414 for receiving data, a combination signal receiving tap 415 for receiving a combination signal from a combined different electronic block, a power supply and communication module 416 connected to the communication unit 50, and a control module 419 including a micro controller unit MCU. Also, the master electronic block 10 may include an input module 417 perceiving input signals through input elements such as buttons, sensors and so on.

The master electronic block 10 in accordance with the fifth embodiment of the present disclosure has the same configuration as that of the second embodiment, except that the control signal transmitting tap is replaced with the combination signal receiving tap 415. In other words, the master electronic block 10 does not transmit the control signal to the lower slave electronic block 20. Instead, the master electronic block 10 may receive the combination signal from the lower slave electronic block 20. The combination signal may indicate that it is combined (or connected) a lower slave electronic block 20.

The combination signal receiving tap 415 is used to receive the combination signal when a different slave electronic block 20 is connected to the lower portion of the master electronic block 10. The combination signal receiving tap 415 may be connected to an input pin GPI of the control module 419 such as the micro controller unit MCU and so on. As such, the control module 419 may receive the combination signal transmitted from the lower slave electronic block 20 through the input pin GPI. A single line connected between the control module 419 and the lower slave electronic block 20 by the combination signal receiving tap 415 will be called as a control line.

The control module 419 determines the combination with a different electronic block (i.e., a slave electronic block 20) in accordance with whether or not the combination signal is received through the combination signal receiving tap 415 or the input pin GPI. If the combination signal is received, the control module 419 may determine that a different electronic block 20 is combined with the master electronic block 10. On the contrary, when the combination signal is not received, the control module 419 may determine that any different electronic block 20 is not combined with the master electronic block 10.

If the combination signal is received, the control module 419 occupies the data communication line and performs the data communication. In detail, the control module 419 may receive instruction, identification code and so on from the connected lower electronic block 20.

As shown in FIG. 27, the slave electronic block 20 in accordance with the fifth embodiment of the present disclosure may include first and second high voltage taps 421a and 421b used to transfer a high voltage Vcc, first and second low voltage taps 422a and 422b used to transfer a low voltage Gnd, and first and second Tx (transmitting) taps 424a and 424b used to transfer the data. Also, the slave electronic block 20 may include a combination signal transmitting tap 425a and a combination signal receiving tap 125b used to transmit or receiving the combination signal to or from a combined different electronic block, and a control module 429 including a micro controller unit MCU.

The slave electronic block 20 in accordance with the fifth embodiment of the present disclosure has the same configuration as that of the above-mentioned second embodiment, except that the slave electronic block 20 transmits or receives the combination signal instead of the control signal. In other words, the slave electronic block 20 receives the combination signal from the lower electronic block 20 and transmits the combination signal to the upper electronic block 10 or 20. The combination signal transmitting tap 425a is used to transmit the combination signal when the slave electronic block 20 is combined with an upper different electronic block 10 or 20. The control module 429 can transmit the combination signal having an activation value instead of a default value. In other words, the slave electronic block 20 is combined with the upper different electronic block 10 or 20, the control module 429 may basically transmit the combination signal to the upper different electronic block 10 or 20.

The combination signal receiving tap 425b is used to receive the combination signal when a different slave electronic block 20 is connected to the lower portion of the slave electronic block 20. The control module 429 determines the combination with a different electronic block (i.e., the different slave electronic block 20) in accordance with whether or not the combination signal is received through the combination signal receiving tap 425b. If the combination signal is received, the control module 429 may determine that a different electronic block 20 is combined with the slave electronic block 20. On the contrary, when the combination signal is not received, the control module 429 may determine that any different electronic block 20 is not combined with the slave electronic block 10.

As seen from an example shown in FIG. 28, all the master electronic block 10 and the slave electronic blocks #1, #2, . . . , # n−1 can receive the combination signal from the electronic blocks #1, #2, . . . , # n, which are connected with their lower portions. However, the last slave electronic block # n cannot receive the combination signal. As such, the slave electronic block unable to receive the combination signal can perceive that it is the last electronic block.

The micro controller unit MCU of the control module 429 may connect an input pin GPI, which supports the general purpose communication, to the combination signal receiving tap 425b and use as a communication pin for receiving the combination signal. Also, the control module 429 may connect an output pin GPO, which supports the general purpose communication, to the combination signal transmitting tap 425a and use as another communication pin for transmitting the combination signal.

An operation procedure of the slave electronic block 20 in accordance with the fifth embodiment of the present disclosure will be described in detail with reference to FIG. 29.

As seen from FIG. 29, when the supply voltage is applied (S31), the control module 429 of the slave electronic block 20 may enter into a stand-by mode waiting to receive the combination signal (S32).

If the control module 429 receives the combination signal, the slave electronic block 20 may be triggered (or activated) and transmit the data (S33). In detail, the control module 429 may transmit one's own identification data through the serial data communication line which is connected with the data line 423c. At this time, the control module 429 may directly transmit the data to the micro controller unit MCU of the master electronic block 10 through the serial data communication line connected with the master electronic block 10.

The identification data may include one's own instruction phrase and/or identification code, the previously described option value of an option electronic block and so on.

Also, when the data transmission is completed, the control module 429 may transmit the combination signal to an upper electronic block 10 or 20 which is connected with one's own electronic block 20 (S34).

On the other hand, in the stand-by mode waiting to receive the combination signal, the control module 429 may check whether or not a lapsed time reaches a previously set time (or a critical time) (S35). If the combination signal is not received during the previously set time (or the critical time), the control module 429 may perform the above-mentioned data transmission process (S33). In this case, the control module 429 may determine that its slave electronic block 20 corresponds to the last electronic block. The last electronic block cannot receive the combination signal. As such, although the combination signal is not received, the last electronic block transmits the data and sends the combination signal to an upper electronic block 10 or 20.

Preferably, after transmitting the combination signal to the upper electronic block 10 or 20, the control module 29 may re-enter into the combination signal stand-by mode (S36). In accordance therewith, the identification data of the electronic blocks can be re-transmitted from the beginning when at least one slave electronic block 20 is additionally connected to the last electronic block 20.

Continuously, an operation procedure of the master electronic block 10 in accordance with the fifth embodiment of the present disclosure will be described in detail with reference to FIG. 30.

As shown in FIG. 30, if the master electronic block 10 is powered-on (S41), the master electronic block 10 may stand-by (or wait) until the data (or the data packet) is received from a lower slave electronic blocks 20 (S42).

If the data is received, the master electronic block 10 may receive the data which is transmitted from the slave electronic block 20 (S43). Preferably, the master electronic block 10 or the control module 419 may receive the data through the Rx data tap 414 which are connected to the data line 424c. More preferably, the master electronic block 10 or the control module 19 may receive the data by performing the serial communication of the UART communication mode.

Thereafter, the master electronic block 10 may check whether or not the combination signal is received (S44). If the combination signal is not received, the master electronic block 10 may repeat processes of standing-by and receiving the data of the slave electronic block 20. As described above, the plurality of slave electronic blocks 20 are cascade-connected to the master electronic block 10. As such, the slave electronic blocks 20 may sequentially transmit their own data to the master electronic block 10 in an inverse connection sequence. In other words, Nth slave electronic block 20 (i.e., the last slave electronic block 20) may firstly transmit one's own data to the master electronic block 10, and then (N−1)th slave electronic block 20 may secondly transmit one's own data to the master electronic block 10.

In accordance therewith, the master electronic block 10 may repeatedly receive the data of the slave electronic block until it is received the data (or the data packets) from all the cascade-connected slave electronic blocks.

When the combination signal is received (S44), the master electronic block 10 may determine that the data to receive does not remain. The combination signal being input to the master electronic block 10 may be a signal that the slave electronic block 20 (i.e., a first slave electronic block 20) directly connected the master electronic block 10 transmits after the transmission of one's own data. In other words, this results from the fact that the last slave electronic block 20 of the inverse connection sequence transmits the combination signal to the master electronic block 10 after the data transmission.

If the combination signal is received, the master electronic block 10 may transmit the received entire data, which is received from the slave electronic blocks 20, to the smart terminal 60 (S45). The data transmitted to the smart terminal 60 may include the number of entire blocks (or nodes) or the number of slave electronic blocks, a sequence of the blocks, identification data of each block and so on. The number of nodes or blocks meaning to the total number of slave electronic blocks may represent the number of received data (or received data packets). Also, the sequence of nodes or blocks may indicate an inverse receiving sequence of the data (or the data packets).

Subsequently, programming units capable of being represented by the electronic blocks in accordance with an embodiment of the present disclosure will be described with reference to FIG. 31.

FIG. 14a is a table representing programming instruction (or command) units. In FIG. 31A, the programming instruction (or command) units are discriminately displayed into a basic level and an advanced level. The basic level and the advanced level can be individually implemented in different embodiments from each other. Also, the basic level and the advanced level can be unifiedly implemented in a single embodiment.

An event instruction (or command) can be executed when a specific event occurs. Such an event instruction (or command) may be executed by the above-mentioned master electronic block 10.

The instruction units include instructions (or commands) for executing specific operations. For example, the instruction units may include linear movement instructions, rotation movement instructions, sound instructions, data instructions, pen movement instructions and so on. Moreover, the instruction (or command) units may further include repetitive flow control instruction (or commands), conditional flow control instructions (or commands), function instructions (commands) and so on.

FIG. 31B is a table representing option instructions (or commands), which are used in the programming instruction units, and descriptions about the sprite 80.

The option instructions (or commands) may be implemented by the above-mentioned optional electronic block 30. The sprite 80 may become a device including a moving means, such as a vehicle or others, and a communication means. For example, the sprite 80 can become a remote-controlled model (or toy) vehicle or others.

The electronic blocks in accordance with an embodiment of the present disclosure will now be described with reference to FIGS. 32 and 33.

As shown in FIG. 32, the master electronic block 10 can implement an event block. The slave electronic blocks 20 can implement motion blocks which represent motions, color display blocks which represents colors, pen motion blocks, data blocks and so on.

Also, the flow control blocks can be implemented by repetitive statement block, conditional statement block and so on, as shown in FIG. 33.

The repetitive statement block represents a repeat execution. Such a repetitive statement block can be classified into two kinds of a forever block and a repeat block, as shown in FIGS. 33A and 33B. The repeat block can designate a repeat execution as the option value of the optional electronic block 30. Also, the repetitive statement block may include one of an 'End of forever' block and an 'End of repeat' block which each represents the end of a repeat interval. The 'End of forever' block and the 'End of repeat' block may be disposed at the end of the repetitive statement.

The conditional statement can be distinguished into two kinds.

First, the conditional statement can represent an execution interval only when a condition is true. In this case, the conditional state may include an 'end if' block, which represents the end of the execution interval proceeding when the condition is true, in the exception of a conditional statement block such as a 'if x>☐ then' block, as shown in FIG. 33C. The 'end if' block is disposed at the end of the conditional statement and allows the end of the condition to be recognized.

In another manner, the conditional statement can present execution interval not only when a condition is true but also when the condition is false, as shown in FIG. 33D. In this case, instructions between a 'if then' block and an 'else' block can be executed when the condition is true and different instructions (commands) between the 'else' block and an 'end if' block can be executed when the condition is false, Finally, examples of program programmed using the electronic block kit system in accordance with the embodiment of the present disclosure will be described with reference to FIGS. 34 through 37.

FIG. 34 is a diagram illustrating a program which moves and rotates a sprite and simultaneously changes color of an LED (Light Emitting Diode).

FIG. 35 is a diagram illustrating an exercise program which draws tetragonal spiral. FIG. 35A is a diagram showing a block connection example of the tetragonal spiral drawing program. FIG. 35b is a diagram showing the tetragonal spiral drawing program which is coded (or programmed) using a scratch program. FIG. 35C is a diagram showing an execution resultant of the tetragonal spiral drawing program.

FIG. 36 is a diagram illustrating an exercise program which draws a single snow flower. FIG. 36A is a diagram showing a block connection example of the single-snow-flower drawing program. FIG. 36B is a diagram showing the single-snow-flower drawing program which is coded (or programmed) using a scratch program. FIG. 36C is a diagram showing an execution resultant of the single-snow-flower drawing program.

FIG. 37 is a diagram illustrating an exercise program which draws an octagonal spiral. FIG. 37A is a diagram showing a block connection example of the octagonal spiral drawing program. FIG. 37B is a diagram showing the octagonal spiral drawing program which is coded (or programmed) using a scratch program. FIG. 37C is a diagram showing an execution resultant of the octagonal spiral drawing program Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure.

| [Description of Reference numbers] | |
|---|---|
| 10: Master Electronic Block | 20: Slave Electronic Block |
| 30: Optional Electronic Block | 50: Communication Unit |
| 60: Smart Terminal | 70: Program Execution Tool |
| 80: Sprite Device | |

What is claimed is:

1. An electronic block kit system of being used for programming and connected to a smart terminal, the electronic block kit system comprising:
   a master electronic block connected to the smart terminal and configured to form a data communication path with the smart terminal and receive a supply voltage; and
   a plurality of slave electronic blocks,
   wherein
   each of the plurality of slave electronic blocks is capable of being combined with one of the master electronic block and a different slave electronic block,
   the master electronic block is disposed at a most upper position and the plurality of slave electronic blocks are cascade-combined to a lower portion of the master electronic block,
   each of the plurality of slave electronic blocks is combined with one of the master electronic block and the different slave electronic block at an upper portion of the slave electronic block to form a data communication path, and receives the supply voltage from the combined electronic block combined at the upper portion of the slave electronic block,
   each of the master electronic block and the plurality of slave electronic blocks does not occupy the data communication path when a combination signal is received from the different slave electronic block combined with one's own lower portion, and not only occupies the data communication path but also transmits one's own electronic block identification data when the combination signal is not received from the different slave electronic block combined with one's own lower portion, wherein the combination signal is a signal indicating that the different slave electronic block is combined to a lower portion of the master electronic block or a lower portion of the slave electronic block,
   each of the plurality of slave electronic blocks intercepts the combination signal being applied to one of the master electronic block and the different slave electronic block which is combined with one's own upper portion after the transmission of one's own electronic block identification data, and each of the slave electronic blocks stands by until a combination signal is received from another different slave electronic block combined with one's own lower portion when a supply voltage is received from one of the master electronic block and the different slave electronic block, transmits one's own electronic block identification data toward the master electronic block when the combination signal is received, and then transmits the combination signal to the different electronic block connected with the slave electronic block and wherein each of the slave electronic blocks stands by the receipt of the combination signal from another different slave electronic block during previously set time and not only transmits one's own electronic block identification data toward the master electronic block but also applies the combination signal to one of the master electronic block and the different electronic block when the combination signal is not received.

2. The electronic block kit system claimed as claim 1 further comprising an optional electronic block, wherein the optional electronic block is inserted into the plurality of slave electronic blocks and configured to output an option value, wherein when the option value is received from the optional electronic block, the plurality of slave electronic blocks add the option value to the identification data and transmits the identification data including the option value.

3. The electronic block kit system claimed as claim 2, wherein the optional electronic block receives the supply voltage from the plurality of slave electronic blocks and applies a divided voltage to the plurality of slave electronic blocks, wherein the divided voltage varies along a division rate of the internal resistor divider.

4. The electronic block kit system claimed as claim 1, wherein each of the plurality of slave electronic blocks intercepts the combination signal being applied to one of the master electronic block and the different slave electronic block, which is combined with one's own upper portion, in response to an interception instruction received through the data communication path after one's own electronic block identification data is transmitted the occupied data communication path.

5. The electronic block kit system claimed as claim 1, wherein when an occupation start signal is received through the data communication path, each of the master electronic block and the plurality of slave electronic blocks occupies the data communication path and performs the data communication regardless of the combination signal.

* * * * *